(12) United States Patent
Sato et al.

(10) Patent No.: US 12,392,947 B2
(45) Date of Patent: Aug. 19, 2025

(54) OPTICAL LAMINATE, LIGHT GUIDE ELEMENT, AND IMAGE DISPLAY DEVICE

(71) Applicant: FUJIFILM Corporation, Tokyo (JP)

(72) Inventors: Hiroshi Sato, Minami-ashigara (JP); Yukito Saitoh, Minami-ashigara (JP); Katsumi Sasata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 796 days.

(21) Appl. No.: 17/226,329

(22) Filed: Apr. 9, 2021

(65) Prior Publication Data

US 2021/0223448 A1 Jul. 22, 2021

Related U.S. Application Data

(63) Continuation of application No. PCT/JP2019/039755, filed on Oct. 9, 2019.

(30) Foreign Application Priority Data

Oct. 12, 2018 (JP) ................. 2018-193490

(51) Int. Cl.
 *G02B 5/30* (2006.01)
 *F21V 8/00* (2006.01)
 *G02B 27/01* (2006.01)

(52) U.S. Cl.
 CPC ......... *G02B 5/3016* (2013.01); *G02B 6/0023* (2013.01); *G02B 6/005* (2013.01); *G02B 6/0056* (2013.01); *G02B 27/0172* (2013.01)

(58) Field of Classification Search
 CPC .... G02B 5/3016; G02B 6/0023; G02B 6/005; G02B 6/0056; G02B 27/0172;
 (Continued)

(56) References Cited

U.S. PATENT DOCUMENTS 6,549,254 B1 4/2003 Grupp et al.
2003/0058387 A1 3/2003 Fuenfschilling et al.
(Continued)

FOREIGN PATENT DOCUMENTS

JP 2000-56115 A 2/2000
JP 2001-91944 A 4/2001
(Continued)

OTHER PUBLICATIONS

International Preliminary Report on Patentability and Written Opinion of the International Searching Authority with an English translation (forms PCT/IB373 and PCT/ISA/237), dated Apr. 8, 2021, for corresponding International Application No. PCT/JP2019/039755.
(Continued)

*Primary Examiner* — Thomas K Pham
*Assistant Examiner* — Kuei-Jen L Edenfield
(74) *Attorney, Agent, or Firm* — Birch, Stewart, Kolasch & Birch, LLP

(57) ABSTRACT

Provided are an optical laminate that can refract incident light with a high use efficiency to be incident into a light guide plate or the like, and a light guide element and an image display device including the optical laminate. The optical laminate includes first and second cholesteric liquid crystal layers that have a liquid crystal alignment pattern in which a direction of an optical axis derived from a liquid crystal compound changes while continuously rotating in at least one in-plane direction, in which in the first and second cholesteric liquid crystal layers, helical pitches in a cholesteric liquid crystalline phase are different from each other, turning directions of circularly polarized light to be reflected are the same, and rotation directions of the direction of the optical axis that continuously rotates in at least one in-plane direction in the liquid crystal alignment pattern are the same.

18 Claims, 8 Drawing Sheets

(58) Field of Classification Search
CPC ........ G02B 6/0011; G02B 5/30; G02B 27/01; G09F 9/00; G02F 1/116; G02F 1/133541; G02F 1/133543; G02F 1/13718; G02F 2201/343; F21V 8/00
USPC .......................... 359/492; 349/201; 428/1.2
See application file for complete search history.

(56) References Cited

U.S. PATENT DOCUMENTS

| | | | |
|---|---|---|---|
| 2010/0134724 A1* | 6/2010 | Arakawa | G02F 1/133533 359/485.02 |
| 2010/0225876 A1 | 9/2010 | Escuti et al. | |
| 2016/0033698 A1 | 2/2016 | Escuti et al. | |
| 2017/0343807 A1 | 11/2017 | Anzai et al. | |
| 2018/0143438 A1* | 5/2018 | Oh | G02B 6/0056 |
| 2018/0164480 A1* | 6/2018 | Yoshida | G02B 5/10 |
| 2018/0164627 A1* | 6/2018 | Oh | G02F 1/011 |

FOREIGN PATENT DOCUMENTS

| | | |
|---|---|---|
| JP | 2003-521742 A | 7/2003 |
| JP | 2010-525394 A | 7/2010 |
| JP | 2012-203123 A | 10/2012 |
| JP | 2017-522601 A | 8/2017 |
| WO | WO 98/20391 A1 | 5/1998 |
| WO | WO 2016/066219 A1 | 5/2016 |
| WO | WO 2016/133186 A1 | 8/2016 |
| WO | WO 2018/084076 A1 | 5/2018 |
| WO | WO 2018/094096 A1 | 5/2018 |

OTHER PUBLICATIONS

International Search Report (form PCT/ISA/210), dated Nov. 19, 2019, for corresponding International Application No. PCT/JP2019/039755, with an English translation.

Kress et al., "Towards the Ultimate Mixed Reality Experience: HoloLens Display Architecture Choices," SID 2017 Digest, 11-1, Invited Paper, pp. 127-131.

Japanese Notice of Reasons for Refusal for corresponding Japanese Application No. 2020-551184, dated Apr. 26, 2022, with an English translation.

* cited by examiner

OPTICAL LAMINATE, LIGHT GUIDE ELEMENT, AND IMAGE DISPLAY DEVICE

CROSS-REFERENCE TO RELATED APPLICATIONS

This application is a Continuation of PCT International Application No. PCT/JP2019/039755 filed on Oct. 9, 2019, which claims priority under 35 U.S.C. § 119 (a) to Japanese Patent Application No. 2018-193490 filed on Oct. 12, 2018. The above application is hereby expressly incorporated by reference, in its entirety, into the present application.

BACKGROUND OF THE INVENTION

1. Field of the Invention

The present invention relates to an optical laminate that reflects light, a light guide element including the optical element, and an image display device including the light guide element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light is totally reflected and propagates in the light guide plate. The light propagated in the light guide plate is also diffracted by the diffraction element in the other end portion of the light guide plate and is emitted from the light guide plate to an observation position by the user.

As an example of a diffraction element that is used for AR glasses and allows light to be incident into a light guide plate at an angle, a reflective structure described in WO2016/066219A including a cholesteric liquid crystal layer that is obtained by immobilizing a cholesteric liquid crystalline phase can be used.

This reflective structure includes a plurality of helical structures each of which extends in a predetermined direction. In addition, this reflective structure includes: a first incidence surface that intersects the predetermined direction and into which light is incident; and a reflecting surface that intersects the predetermined direction and reflects the light incident from the first incidence surface, in which the first incidence surface includes one of both end portions in each of the plurality of helical structures. In addition, each of the plurality of helical structures includes a plurality of structural units that lies in the predetermined direction, and each of the plurality of structural units includes a plurality of elements that are helically twisted and laminated. In addition, each of the plurality of structural units includes a first end portion and a second end portion, the second end portion of one structural unit among structural units adjacent to each other in the predetermined direction forms the first end portion of the other structural unit, and alignment directions of the elements positioned in the plurality of first end portions included in the plurality of helical structures are aligned. Further, the reflecting surface includes at least one first end portion included in each of the plurality of helical structures and is not parallel to the first incidence surface.

A reflective structure (cholesteric liquid crystal layer) described in WO2016/066219A has a liquid crystal alignment pattern in which a direction of an optical axis derived from the liquid crystal compound changes while continuously rotating in at least one in-plane direction. The cholesteric liquid crystal layer described in WO2016/066219A has the above-described liquid crystal alignment pattern so as to include the reflecting surface that is not parallel to the first incidence surface.

A general cholesteric liquid crystal layer reflects incident light by specular reflection.

On the other hand, the reflective structure described in WO2016/066219A reflects incident light with an angle in the predetermined direction with respect to specular reflection instead of specular reflection. For example, in the cholesteric liquid crystal layer described in WO2016/066219A, light incident from the normal direction is reflected with an angle with respect to the normal direction instead of being reflected in the normal direction.

Accordingly, by using this optical element, an image formed by a display is diffracted, light is introduced into a light guide plate at an angle, and the light can be guided in the light guide plate.

SUMMARY OF THE INVENTION

Incidentally, for AR glasses, it is required that a field of view (FOV) that is a region where an image is displayed is wide.

However, in a case where the optical element described in WO2016/066219A is used for AR glasses, the use efficiency of light emitted from a display is low, and there may be a case where a sufficient field of view cannot be obtained.

An object of the present invention is to solve the problems of the related art and to provide an optical laminate that can refract incident light with a high use efficiency to be incident into a light guide plate or the like, a light guide element that includes the optical laminate and can display an image at a wider field of view in case of being used for, for example, AR glasses, and an image display device including the light guide element.

In order to achieve the object, the present invention has the following configurations.

[1] An optical laminate comprising:
a first cholesteric liquid crystal layer and a second cholesteric liquid crystal layer that are obtained by immobilizing a cholesteric liquid crystalline phase and have a liquid crystal alignment pattern in which a direction of an optical axis derived from a liquid crystal compound changes while continuously rotating in at least one in-plane direction,
in which in the first cholesteric liquid crystal layer and the second cholesteric liquid crystal layer,
helical pitches as lengths in a thickness direction over which the liquid crystal compound that is helically turned and laminated in the cholesteric liquid crystalline phase turns by 360° are different from each other, turning directions of circularly polarized light to be reflected are the same, and rotation directions of the direction of the optical axis derived from the liquid crystal compound that continuously rotates in at least one in-plane direction in the liquid crystal alignment pattern are the same.

[2] An optical laminate comprising:

a first cholesteric liquid crystal layer and a second cholesteric liquid crystal layer that are obtained by immobilizing a cholesteric liquid crystalline phase and have a liquid crystal alignment pattern in which a direction of an optical axis derived from a liquid crystal compound changes while continuously rotating in at least one in-plane direction, in which in the first cholesteric liquid crystal layer and the second cholesteric liquid crystal layer, helical pitches as lengths in a thickness direction over which the liquid crystal compound that is helically turned and laminated in the cholesteric liquid crystalline phase turns by 360° are different from each other, turning directions of circularly polarized light to be reflected are opposite to each other, and rotation directions of the direction of the optical axis derived from the liquid crystal compound that continuously rotates in at least one in-plane direction in the liquid crystal alignment pattern are opposite to each other.

[3] The optical laminate according to [1] or [2], in which in the liquid crystal alignment pattern of the first cholesteric liquid crystal layer and the liquid crystal alignment pattern of the second cholesteric liquid crystal layer, the direction of the optical axis derived from the liquid crystal compound changes while continuously rotating only in the one in-plane direction, and in the liquid crystal alignment pattern of the first cholesteric liquid crystal layer and the liquid crystal alignment pattern of the second cholesteric liquid crystal layer, the one in-plane directions are the same.

[4] The optical laminate according to any one of [1] to [3], in which in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, lengths of the single periods in the liquid crystal alignment pattern of the first cholesteric liquid crystal layer and the liquid crystal alignment pattern of the second cholesteric liquid crystal layer are the same.

[5] The optical laminate according to any one of [1] to [4], in which in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, the liquid crystal alignment pattern of the first cholesteric liquid crystal layer and the liquid crystal alignment pattern of the second cholesteric liquid crystal layer have a region where the single period is 10 µm or less.

[6] The optical laminate according to any one of [1] to [5], in which in a case where light components having the same center wavelength are incident at different angles in a range from a normal direction to a direction having an angle of 40° with respect to a normal line, the first cholesteric liquid crystal layer and the second cholesteric liquid crystal layer have an overlapping angle region where a reflectivity is 20% or higher.

[7] The optical laminate according to any one of [1] to [6], comprising:

a plurality of combinations of the first cholesteric liquid crystal layers and the second cholesteric liquid crystal layers, in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, in the plurality of combinations of the first cholesteric liquid crystal layers and the second cholesteric liquid crystal layers, a permutation of lengths of wavelengths in wavelength ranges where light is selectively reflected is the same as a permutation of lengths of the single periods.

[8] The optical laminate according to [7], comprising:

two or more combinations among the combinations including a combination of the first cholesteric liquid crystal layer and the second cholesteric liquid crystal layer having a wavelength range where light is selectively reflected in a red light range, a combination of the first cholesteric liquid crystal layer and the second cholesteric liquid crystal layer having a wavelength range where light is selectively reflected in a green light range, and a combination of the first cholesteric liquid crystal layer and the second cholesteric liquid crystal layer having a wavelength range where light is selectively reflected in a blue light range.

[9] A light guide element comprising:

a light guide plate; and the optical laminate according to any one of [1] to [8] that is provided on the light guide plate.

[10] The light guide element according to [9], in which a plurality of optical laminates spaced from each other are provided on the light guide plate.

[11] An image display device comprising:

the light guide element according to [9] or [10]; and a display element that emits an image to the optical laminate of the light guide element.

[12] The image display device according to [11], in which the display element emits circularly polarized light to the optical laminate.

The optical laminate according to the embodiment of the present invention can refract incident light with a high use efficiency to be incident into a light guide plate or the like. In addition, by using the light guide element according to an aspect of the present invention including the optical laminate and the image display device according to an aspect of the present invention including the light guide element for AR glasses or the like, an image can be displayed at a wide field of view.

DESCRIPTION OF THE PREFERRED EMBODIMENTS

Hereinafter, an optical laminate, a light guide element, and an image display device according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
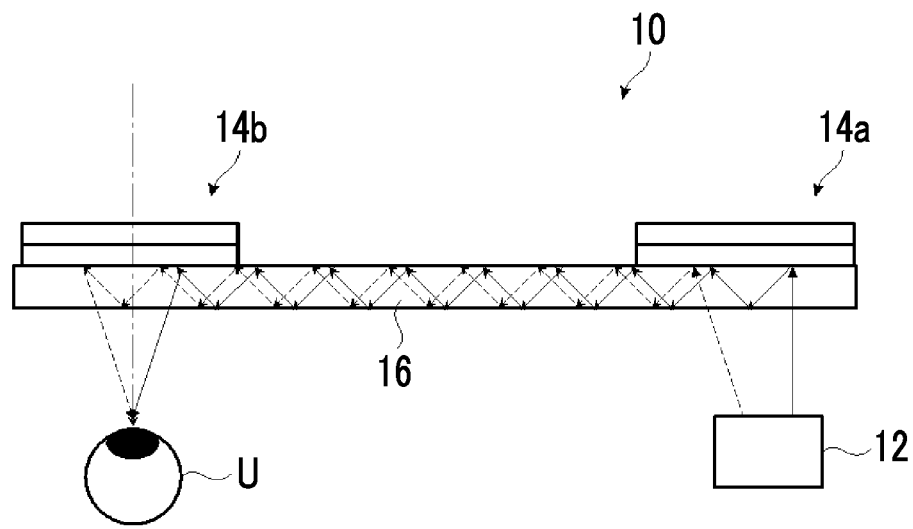
FIG. 1 is a diagram conceptually showing an example of an image display device according to the present invention including an optical laminate and a light guide element according to the present invention.

FIG. 1 conceptually shows an example of the image display device according to the embodiment of the present invention including the light guide element according to the embodiment of the present invention. The light guide element according to the embodiment of the present invention includes the optical laminate according to the embodiment of the present invention.

An image display device 10 shown in FIG. 1 is used as AR glasses as a preferable example. The optical laminate and the light guide element according to the embodiment of the present invention can also be used not only as AR glasses but also as an optical element such as a transparent screen, a lighting device, or a sensor. In addition, the image display device according to the embodiment of the present invention can also be used as an image display device including the optical element. The lighting device includes, for example, a backlight unit of a liquid crystal display.

The image display device 10 shown in FIG. 1 includes a display element 12, optical laminates 14a and 14b, and a light guide plate 16. The optical laminates 14a and 14b are bonded to be spaced from end portions on the same surface of the light guide plate 16 in a longitudinal direction, the optical laminate 14a is on the display element 12 side, and the optical laminate 14b on an image display side.

[Display Element]

The display element 12 displays an image (video) to be observed by an user U and emits the image to the optical laminate 14a through a light guide plate.

Figure 2:
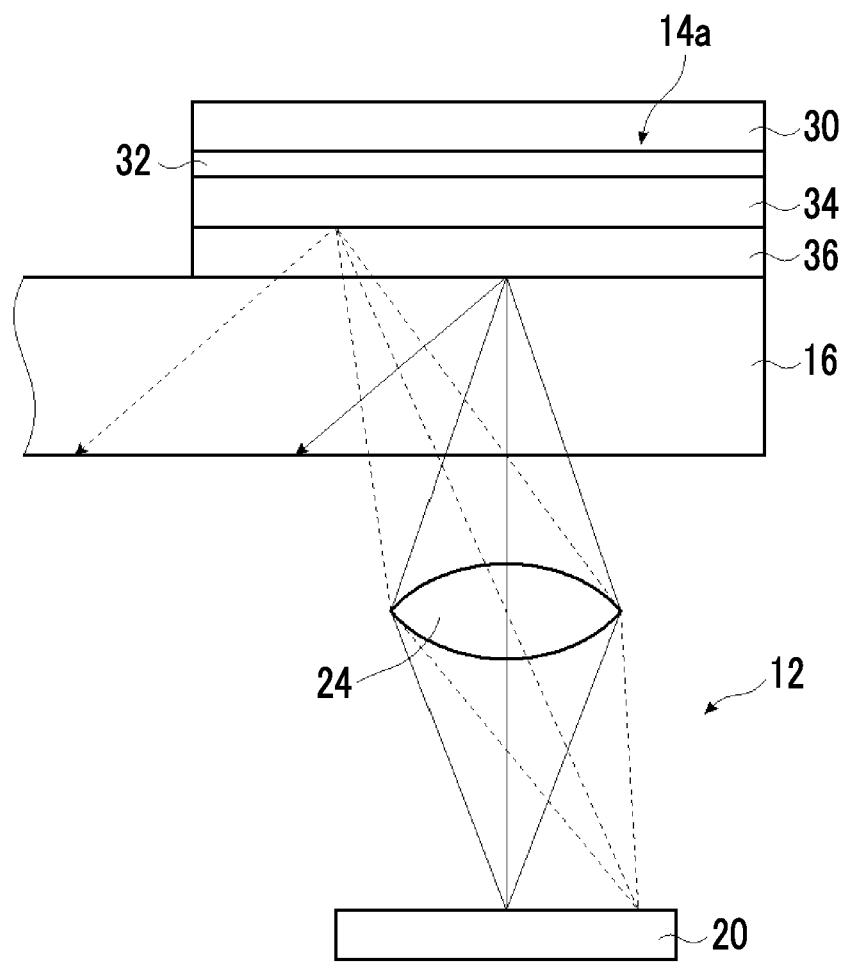
FIG. 2 is a partially enlarged view of FIG. 1.

FIG. 2 conceptually shows a configuration of the display element 12.

In the image display device 10 according to the embodiment of the present invention, as the display element 12, various well-known display elements (a display device, a projector, or an imager) used for AR glasses or the like can be used without any particular limitation. In the example shown in the drawing, the display element 12 includes a display 20 and a projection lens 24.

In the image display device 10 according to the embodiment of the present invention, the display 20 is not particularly limited. For example, various well-known displays used in AR glasses or the like can be used.

Examples of the display 20 include a liquid crystal display, an organic electroluminescence display, and a digital light processing (DLP). Examples of the liquid crystal display include a liquid crystal on silicon (LCOS).

The display 20 may display a monochrome image, a two-color image, or a color image. The image display device 10 in the example shown in the drawing displays, for example, a red monochrome image, and the display 20 displays a red monochrome image.

In the display element 12 used in the image display device 10 according to the embodiment of the present invention, the projection lens 24 is also a well-known projection lens (collecting lens) used for AR glasses or the like.

Here, in the image display device 10 according to the embodiment of the present invention, it is preferable that the display element 12 emits circularly polarized light.

Accordingly, in a case where the display 20 emits an unpolarized light image, and it is preferable that the display element 12 includes, for example, a circular polarization plate including a linear polarizer and an $\lambda/4$ plate. In addition, in a case where the display 20 emits a linearly polarized light image, it is preferable that the display element 12 includes, for example, a $\lambda/4$ plate.

In the example shown in the drawing, the display element 12 emits, for example, a right circularly polarized light image.

In addition, in order to improve visibility for the optical laminate and the image display device according to the embodiment of the present invention, a diffractive optical method of enlarging an exit pupil may be used. Specifically, an optical method of using a plurality of diffractive elements (optical laminates), that is, an optical method of using in-coupling, intermediate and out-coupling diffractive element can be used. This method is described in detail in JP2008-546020A.

[Light Guide Plate]

In the image display device 10, the light guide plate 16 is a well-known light guide plate that reflects light incident thereinto and guides (propagates) the reflected light. The light guide element according to the embodiment of the present invention is configured with the light guide plate 16 and the optical laminate 14a and/or the optical laminate 14b.

As the light guide plate 16, various light guide plates used for a backlight unit or the like of AR glasses or a liquid crystal display can be used without any particular limitation.

[Optical Laminate]

The optical laminates 14a and 14b are the optical laminates according to the embodiment of the present invention.

In the image display device 10 (the light guide element in the example shown in the drawing), the optical laminates 14 are disposed at both end portions of the same surface of the light guide plate 16 in a longitudinal direction.

Although not shown in the drawing, the optical laminates 14 are bonded to the light guide plate through a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the optical laminates 14 and the light guide plate 16 may be laminated and held by a frame, a holding device, or the like to configure the light guide element according to the embodiment of the present invention.

Alternatively, the optical laminates 14 may be directly formed on the light guide plate 16.

Figure 3:
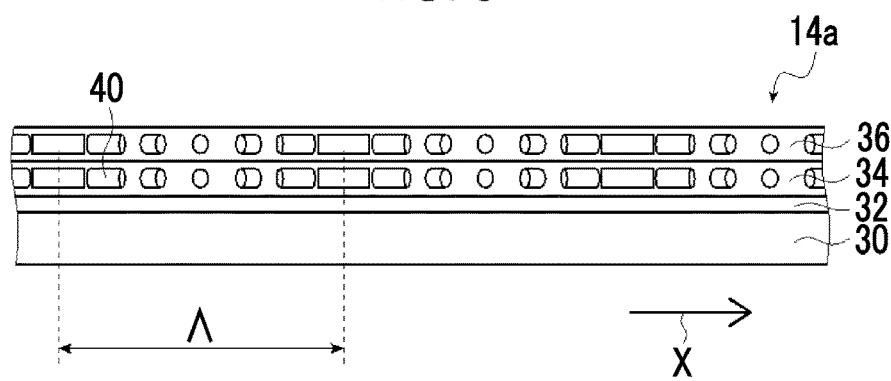
FIG. 3 is a diagram conceptually showing an example of the optical laminate according to the present invention.

FIG. 3 conceptually shows the optical laminate 14a. The optical laminate 14a shown in FIG. 3 includes a support 30, an alignment film 32, a first cholesteric liquid crystal layer 34, and a second cholesteric liquid crystal layer 36. In FIG. 1, in order to simplify the drawing, only the first cholesteric liquid crystal layer 34 and the second cholesteric liquid crystal layer 36 are shown as the optical laminate 14.

In the following description, the optical laminate 14a is used as a representative example. However, the optical laminate 14a and the optical laminate 14b basically have the same configuration and exhibits the same effect. In this case, in the optical laminate 14a and the optical laminate 14b, rotation directions of an optical axis 40A of a liquid crystal compound 40 in an in-plane direction (arrow X direction described below) in a liquid crystal alignment pattern of a cholesteric liquid crystal layer are opposite to each other.

The optical laminate 14a shown in the drawing includes the support 30, the alignment film 32, the first cholesteric liquid crystal layer 34, and the second cholesteric liquid crystal layer 36, but the present invention is not limited thereto. The optical laminate according to the embodiment of the present invention may include only the alignment film 32, the first cholesteric liquid crystal layer 34, and the second cholesteric liquid crystal layer 36 by peeling off the support 30 after bonding the optical laminate 14a to the light guide plate 16. The optical laminate according to the embodiment of the present invention may include only the first cholesteric liquid crystal layer 34 and the second cholesteric liquid crystal layer 36 by peeling off the support 30 and the alignment film 32 after bonding the optical laminate 14a to the light guide plate 16.

<Support>

In the optical laminate 14, the support 30 supports the alignment film 32, the first cholesteric liquid crystal layer 34, and the second cholesteric liquid crystal layer 36.

In the following description, in a case where it is not necessary to distinguish between the first cholesteric liquid crystal layer 34 and the second cholesteric liquid crystal layer 36, the first cholesteric liquid crystal layer 34 and the second cholesteric liquid crystal layer 36 will be collectively referred to as "cholesteric liquid crystal layer".

As the support 30, various sheet-shaped materials (films or plate-shaped materials) can be used as long as they can support the alignment film 32 and the cholesteric liquid crystal layer.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the optical laminate 14a, a material for forming the support 30, and the like in a range where the alignment film 32 and the cholesteric liquid crystal layer can be supported.

The thickness of the support 30 is preferably 1 to 1000 µm, more preferably 3 to 250 µm, and still more preferably 5 to 150 µm.

The support 30 may have a single-layer structure or a multi-layer structure.

In a case where the support 30 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a single-layer structure that is provided as a substrate; and another layer that is provided on a surface of the substrate.

<Alignment Film>

In the optical laminate 14, the alignment film 32 is formed on a surface of the support 30.

The alignment film 32 is an alignment film for aligning the liquid crystal compound 40 to a predetermined liquid crystal alignment pattern during the formation of the first cholesteric liquid crystal layer 34 of the optical laminate 14.

Although described below, in the optical laminate 14 according to the embodiment of the present invention, the cholesteric liquid crystal layer has a liquid crystal alignment pattern in which a direction of an optical axis 40A (refer to FIG. 3) derived from the liquid crystal compound 40 changes while continuously rotating in one in-plane direction. Accordingly, the alignment film 32 is formed such that the cholesteric liquid crystal layer can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-097377A, JP2005-099228A, and JP2005-128503A is preferable.

In the optical laminate 14 according to the embodiment of the present invention, for example, the alignment film 32 can be suitably used as a so-called photo-alignment film obtained by irradiating a photo-alignable material with polarized light or non-polarized light. That is, in the optical laminate 14 according to the embodiment of the present invention, a photo-alignment film that is formed by applying a photo-alignable material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 9:
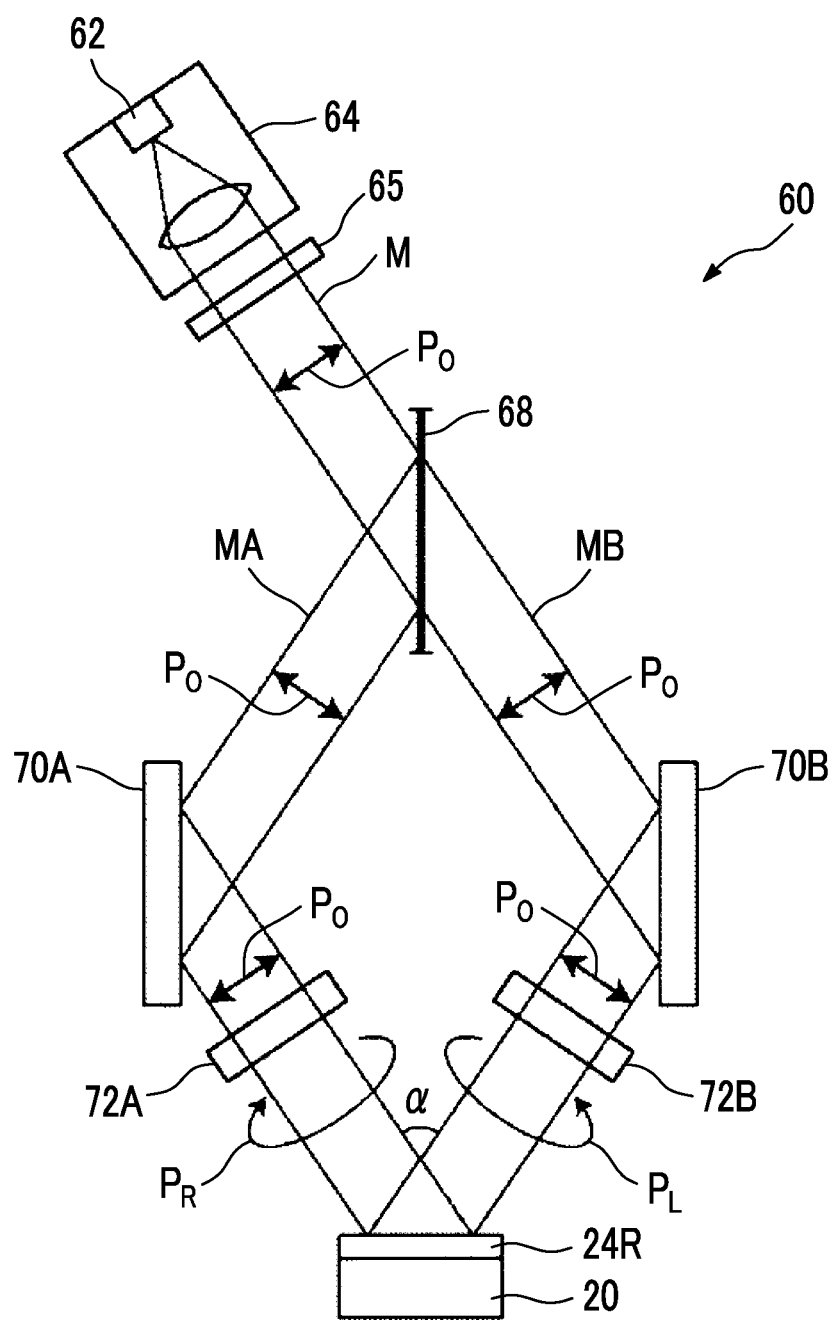
FIG. 9 is a conceptual diagram showing another example of an exposure device that exposes an alignment film in the optical laminate shown in FIG. 3.

FIG. 9 conceptually shows an example of an exposure device that exposes the alignment film 32 to form an alignment pattern.

An exposure device 60 shown in FIG. 9 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plates 72A and 72B have optical axes parallel to each other. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, in the alignment film 32, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

In the optical element according to the embodiment of the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the cholesteric liquid crystal layer or the like has the liquid crystal alignment pattern in which the direction of the optical axis 40A derived from the liquid crystal compound 40 changes while continuously rotating in at least one in-plane direction. That is, in the present invention, the support 30 can be made to function as the alignment film.

<Cholesteric Liquid Crystal Layer>

In the optical laminate 14, the first cholesteric liquid crystal layer 34 is formed on a surface of the alignment film 32. Further, in the optical laminate 14, the second cholesteric liquid crystal layer 36 is formed on a surface of the first cholesteric liquid crystal layer 34.

Both the first cholesteric liquid crystal layer 34 and the second cholesteric liquid crystal layer 36 are obtained by immobilizing a cholesteric liquid crystalline phase.

In FIG. 3, in order to simplify the drawing and to clarify the configuration of the optical laminate 14, only the liquid crystal compound 40 (liquid crystal compound molecules) on the surface of the alignment film 32 and the first cholesteric liquid crystal layer 34 is conceptually shown as the first cholesteric liquid crystal layer 34 and the second cholesteric liquid crystal layer 36. However, as conceptually shown in FIG. 4 using the first cholesteric liquid crystal layer 34, each of the first cholesteric liquid crystal layer 34 and the second cholesteric liquid crystal layer 36 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength selective reflection properties.

Figure 4:
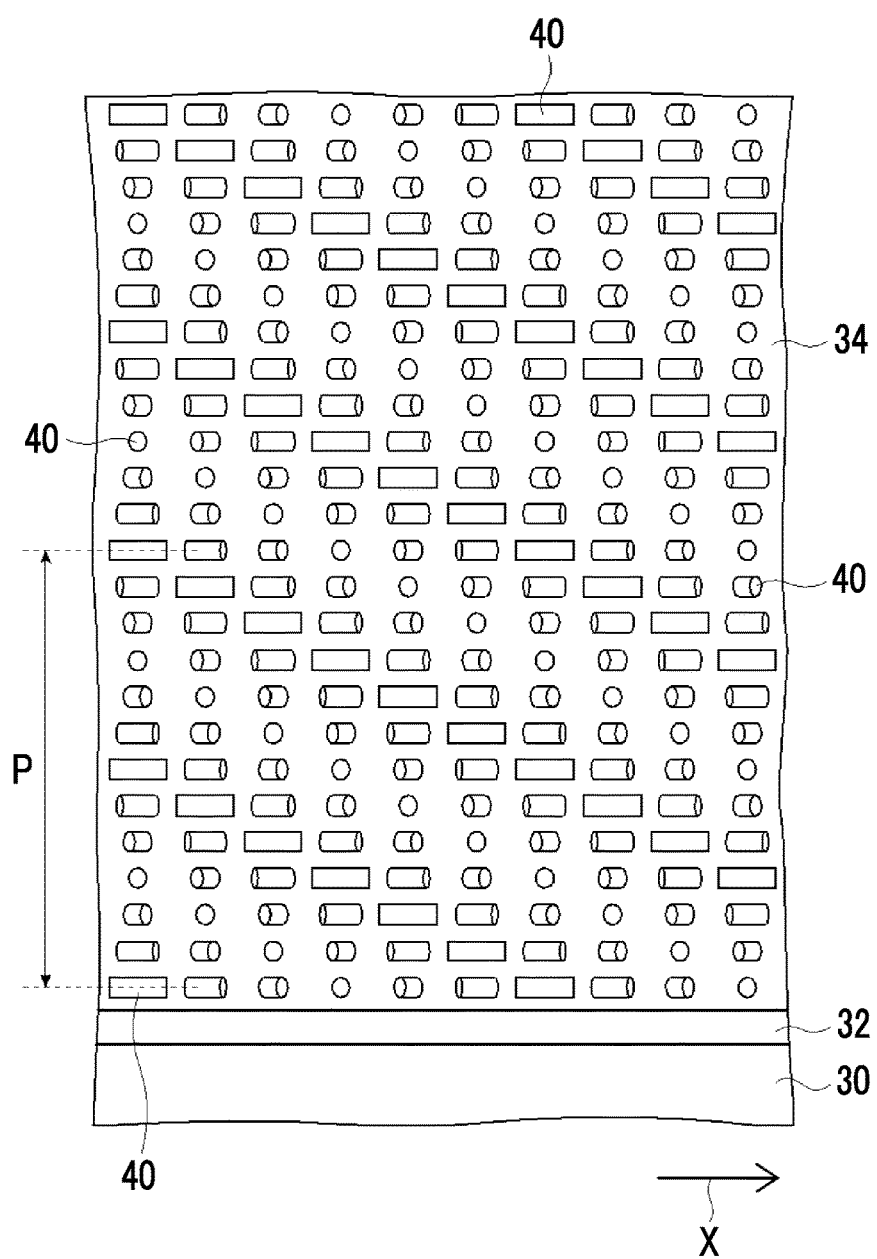
FIG. 4 is a conceptual diagram showing a cholesteric liquid crystal layer in the optical laminate shown in FIG. 3.

Although described below in detail, the selective reflection wavelength range of the cholesteric liquid crystal layer depends on the length of one helical pitch described above in the thickness direction. In the optical laminate 14 in the example shown in the drawing, for example, a pitch P of the first cholesteric liquid crystal layer 34 is longer than a pitch P of the second cholesteric liquid crystal layer 36. Accordingly, in the optical laminate 14 in the example shown in the drawing, the first cholesteric liquid crystal layer 34 selectively reflects light in a longer wavelength range than the second cholesteric liquid crystal layer 36. FIG. 4 shows the length (pitch P) of one helical pitch in the thickness direction.

As described above, the first cholesteric liquid crystal layer 34 and the second cholesteric liquid crystal layer 36 are obtained by immobilizing a cholesteric liquid crystalline phase.

That is, both the first cholesteric liquid crystal layer 34 and the second cholesteric liquid crystal layer 36 are formed of the liquid crystal compound 40 (liquid crystal material) having a cholesteric structure.

<<Cholesteric Liquid Crystalline Phase>>

It is known that the cholesteric liquid crystalline phase exhibits selective reflection properties at a specific wavelength.

A center wavelength $\lambda$ of selective reflection (selective reflection center wavelength) $\lambda$ of a general cholesteric liquid crystalline phase depends on a helical pitch P in the cholesteric liquid crystalline phase and complies with a relationship of $\lambda=n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

As described above, the helical pitch P corresponds to one pitch (helical period) of the helical structure of the cholesteric liquid crystalline phase. In other words, the helical pitch P refers to one helical winding, that is, the length in a helical axis direction in which a director of the liquid crystal compound constituting the cholesteric liquid crystalline phase rotates by 360°. For example, in the case of rod-shaped liquid crystal, the director of the liquid crystal compound is a major axis direction.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and complies with a relationship of $\Delta\lambda=\Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical laminate and may be, for example, 10 to 500 nm and is preferably 20 to 300 nm and more preferably 30 to 100 nm.

<<Method of Forming Cholesteric Liquid Crystal Layer>>

The cholesteric liquid crystal layer (the first cholesteric liquid crystal layer 34 and the second cholesteric liquid crystal layer 36) can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. No. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. No. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl(meth)acrylate or ethylene glycol diglycidyl ether; an aziridine compound such as 2,2-bis hydroxymethyl butanol-tris [3-(1-aziridinyl) propionate] or 4,4-bis(ethyleneiminocarbonylamino) diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

It is preferable that the liquid crystal composition is used as a liquid during the formation of the cholesteric liquid crystal layer (the first cholesteric liquid crystal layer 34 and the second cholesteric liquid crystal layer 36).

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 32, it is preferable that the cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the optical laminate 14, the light reflectivity required for the cholesteric liquid crystal layer, the material for forming the cholesteric liquid crystal layer, and the like.

<<Liquid Crystal Alignment Pattern of Cholesteric Liquid Crystal Layer>>

As described above, in the optical laminate 14 according to the embodiment of the present invention, the cholesteric liquid crystal layer (the first cholesteric liquid crystal layer 34 and the second cholesteric liquid crystal layer 36) has the liquid crystal alignment pattern in which the direction of the optical axis 40A derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-shaped liquid crystal compound, the optical axis 40A is along a rod-shaped major axis direction. In the following description, the optical axis 40A derived from the liquid crystal compound 40 will also be referred to as "the optical axis 40A of the liquid crystal compound 40" or "the optical axis 40A".

Figure 5:
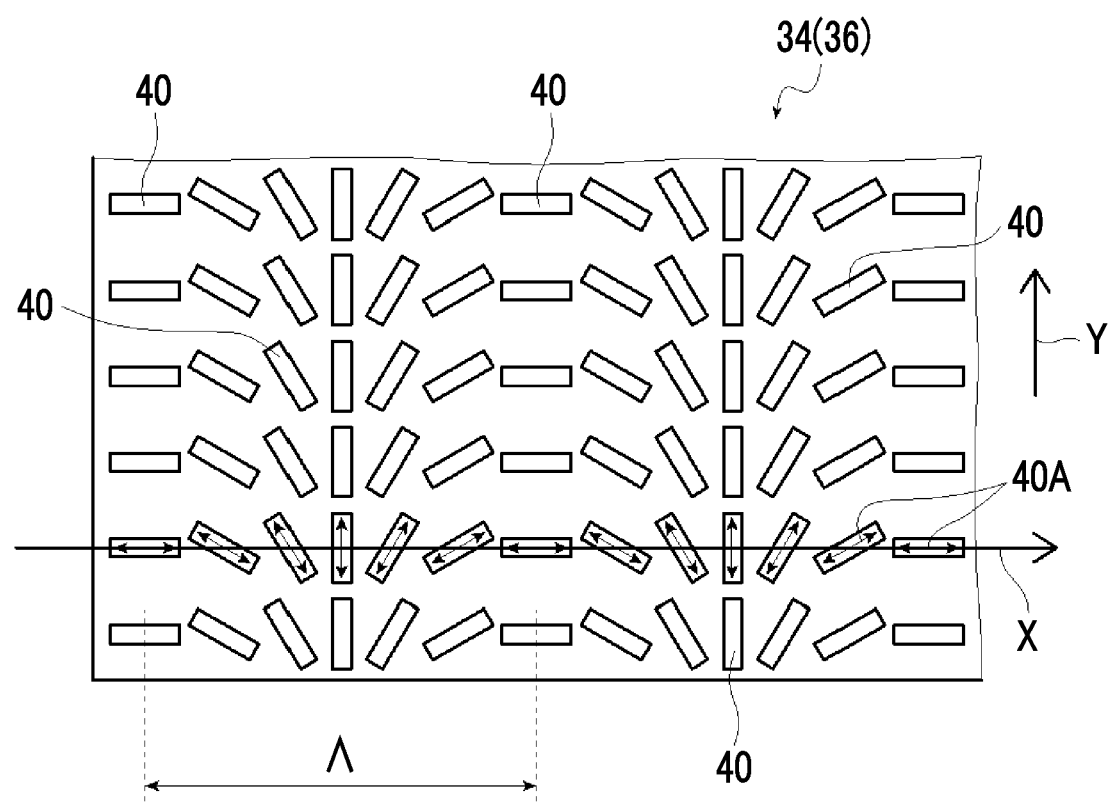
FIG. 5 is a plan view showing the cholesteric liquid crystal layer in the optical laminate shown in FIG. 3.

FIG. 5 is a plan view conceptually showing the first cholesteric liquid crystal layer 34.

The plan view is a view in a case where the optical laminate 14 is seen from the top in FIG. 3, that is, a view in a case where the optical laminate 14 is seen from the thickness direction. In other words, the thickness direction is a laminating direction of the respective layers (films).

In addition, in FIG. 3, in order to clarify the configuration of the optical laminate 14 according to the embodiment of the present invention, only the liquid crystal compound 40 on the surface of the alignment film 32 is shown as in FIG. 3.

FIG. 5 shows the first cholesteric liquid crystal layer 34 as a representative example. The second cholesteric liquid crystal layer 36 basically has the same configuration as that of the first cholesteric liquid crystal layer 34 except that the helical pitches P are different from each other as described below, and exhibits the same effect.

As shown in FIG. 5, on the surface of the alignment film 32, the liquid crystal compound 40 forming the first cholesteric liquid crystal layer 34 is two-dimensionally disposed according to the alignment pattern formed on the alignment film 32 as the lower layer in a predetermined in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 1 and 2 and FIG. 4 described below, the Y direction is a direction perpendicular to the paper plane.

In addition, the liquid crystal compound 40 forming the first cholesteric liquid crystal layer 34 has the liquid crystal alignment pattern in which the direction of the optical axis 40A changes while continuously rotating in the arrow X direction in a plane of the first cholesteric liquid crystal layer 34. In the example shown in the drawing, the liquid crystal compound 40 has the liquid crystal alignment pattern in which the optical axis 40A of the liquid crystal compound 40 changes while continuously rotating clockwise in the arrow X direction.

In a case where the cholesteric liquid crystal layer is formed on the cholesteric liquid crystal layer using the above-described coating method, the liquid crystal alignment pattern of the upper cholesteric liquid crystal layer follows the liquid crystal alignment pattern on the surface of the lower cholesteric liquid crystal layer as a formation surface. Accordingly, the second cholesteric liquid crystal layer 36 formed on the first cholesteric liquid crystal layer 34 has the same liquid crystal alignment pattern as the first cholesteric liquid crystal layer 34.

Specifically, "the direction of the optical axis 40A of the liquid crystal compound 40 changes while continuously rotating in the arrow X direction (the predetermined in-plane direction)" represents that an angle between the optical axis 40A of the liquid crystal compound 40, which is disposed in the arrow X direction, and the arrow X direction varies depending on positions in the arrow X direction, and the angle between the optical axis 40A and the arrow X direction sequentially changes from $\theta$ to $\theta+180°$ or $\theta-180°$ in the arrow X direction.

A difference between the angles of the optical axes 40A of the liquid crystal compound 40 adjacent to each other in the arrow X direction is preferably 45° or less, more preferably 15° or less, and still more preferably less than 15°.

On the other hand, in the liquid crystal compound 40 forming the first cholesteric liquid crystal layer 34, the directions of the optical axes 40A are the same in the Y direction perpendicular to the arrow X direction, that is, the Y direction perpendicular to the one in-plane direction in which the optical axis 40A continuously rotates.

In other words, in the liquid crystal compound 40 forming the first cholesteric liquid crystal layer 34, angles between the optical axes 40A of the liquid crystal compound 40 and the arrow X direction are the same in the Y direction.

In the optical laminate 14 according to the embodiment of the present invention, in the liquid crystal alignment pattern of the liquid crystal compound 40, the length (distance) over which the optical axis 40A of the liquid crystal compound 40 rotates by 180° in the arrow X direction in which the optical axis 40A changes while continuously rotating in a plane is the length A of the single period in the liquid crystal alignment pattern.

That is, a distance between centers of two liquid crystal compounds 40 in the arrow X direction is the length A of the single period, the two liquid crystal compounds having the same angle in the arrow X direction. Specifically, as shown in FIG. 5 (FIG. 6), a distance of centers in the arrow X direction of two liquid crystal compounds 40 in which the arrow X direction and the direction of the optical axis 40A match each other is the length A of the single period. In the following description, the length A of the single period will also be referred to as "single period A".

In the optical laminate 14 according to the embodiment of the present invention, in the liquid crystal alignment pattern of the cholesteric liquid crystal layer, the single period A is repeated in the arrow X direction, that is, in the one in-plane direction in which the direction of the optical axis 40A changes while continuously rotating.

The cholesteric liquid crystal layer obtained by immobilizing a cholesteric liquid crystalline phase typically reflects incident light (circularly polarized light) by specular reflection.

On the other hand, the first cholesteric liquid crystal layer 34 reflects incidence light in a direction having an angle in the arrow X direction with respect to the incidence light. The first cholesteric liquid crystal layer 34 has the liquid crystal alignment pattern in which the optical axis 40A changes while continuously rotating in the arrow X direction in a plane (the predetermined in-plane direction). Hereinafter, the description will be made with reference to FIG. 6.

For example, the first cholesteric liquid crystal layer 34 selectively reflects right circularly polarized light $R_R$ of red light. Accordingly, in a case where light is incident into the first cholesteric liquid crystal layer 34, the first cholesteric liquid crystal layer 34 reflects only right circularly polarized light $R_R$ of red light and allows transmission of the other light.

In a case where the right circularly polarized light $R_R$ of red light incident into the first cholesteric liquid crystal layer 34 is reflected from the cholesteric liquid crystal layer, the absolute phase changes depending on the directions of the optical axes 40A of the respective liquid crystal compounds 40.

Here, in the first cholesteric liquid crystal layer 34, the optical axis 40A of the liquid crystal compound 40 changes while rotating in the arrow X direction (the one in-plane direction). Therefore, the amount of change in the absolute phase of the incident right circularly polarized light $R_R$ of red light varies depending on the directions of the optical axes 40A.

Further, the liquid crystal alignment pattern formed in the first cholesteric liquid crystal layer 34 is a pattern that is periodic in the arrow X direction. Therefore, as conceptually shown in FIG. 4, an absolute phase Q that is periodic in the arrow X direction corresponding to the direction of the optical axis 40A is assigned to the right circularly polarized light $R_R$ of red light incident into the first cholesteric liquid crystal layer 34.

In addition, the direction of the optical axis 40A of the liquid crystal compound 40 with respect to the arrow X direction is uniform in the disposition of the liquid crystal compound 40 in the Y direction perpendicular to arrow X direction.

As a result, in the first cholesteric liquid crystal layer 34, an equiphase surface E that is tilted in the arrow X direction with respect to an XY plane is formed for the right circularly polarized light $R_R$ of red light.

Therefore, the right circularly polarized light $R_R$ of red light is reflected in the normal direction of the equiphase surface E, and the reflected right circularly polarized light $R_R$ of red light is reflected in a direction that is tilted in the arrow X direction with respect to the XY plane. That is, the XY plane is a main surface of the cholesteric liquid crystal layer.

In addition, by reversing the rotation direction of the optical axis 40A of the liquid crystal compound 40 toward the arrow X direction, a reflection direction of the right circularly polarized light $R_R$ of red light can be reversed. That is, in FIGS. 3 to 6, the rotation direction of the optical axis 40A toward the arrow X direction is clockwise, and the right circularly polarized light $R_R$ of red light is reflected toward the arrow X direction. By setting the rotation direction of the optical axis 40A to be counterclockwise, the right circularly polarized light $R_R$ of red light is reflected toward a direction opposite to the arrow X direction.

Both the optical laminates 14a and 14b are disposed such that the arrow X direction matches the longitudinal direction of the light guide plate 16 toward the left side in the drawing.

As described above, in the optical laminate 14a and the optical laminate 14b, rotation directions of the optical axis of the liquid crystal compound in the arrow X direction in a liquid crystal alignment pattern of a cholesteric liquid crystal layer are opposite to each other. Accordingly, in the optical laminate 14a and the optical laminate 14b, reflection directions of the incident right circularly polarized light $R_R$ of red light are opposite to each other, the optical laminate 14a reflects the right circularly polarized light $R_R$ of red light in a direction toward the optical laminate 14b, and the optical laminate 14b reflects the right circularly polarized light $R_R$ of red light in a direction toward the optical laminate 14a.

In the optical laminates 14a and 14b according to the embodiment of the present invention, the second cholesteric liquid crystal layer 36 is provided on a surface of the first cholesteric liquid crystal layer 34.

Figure 6:
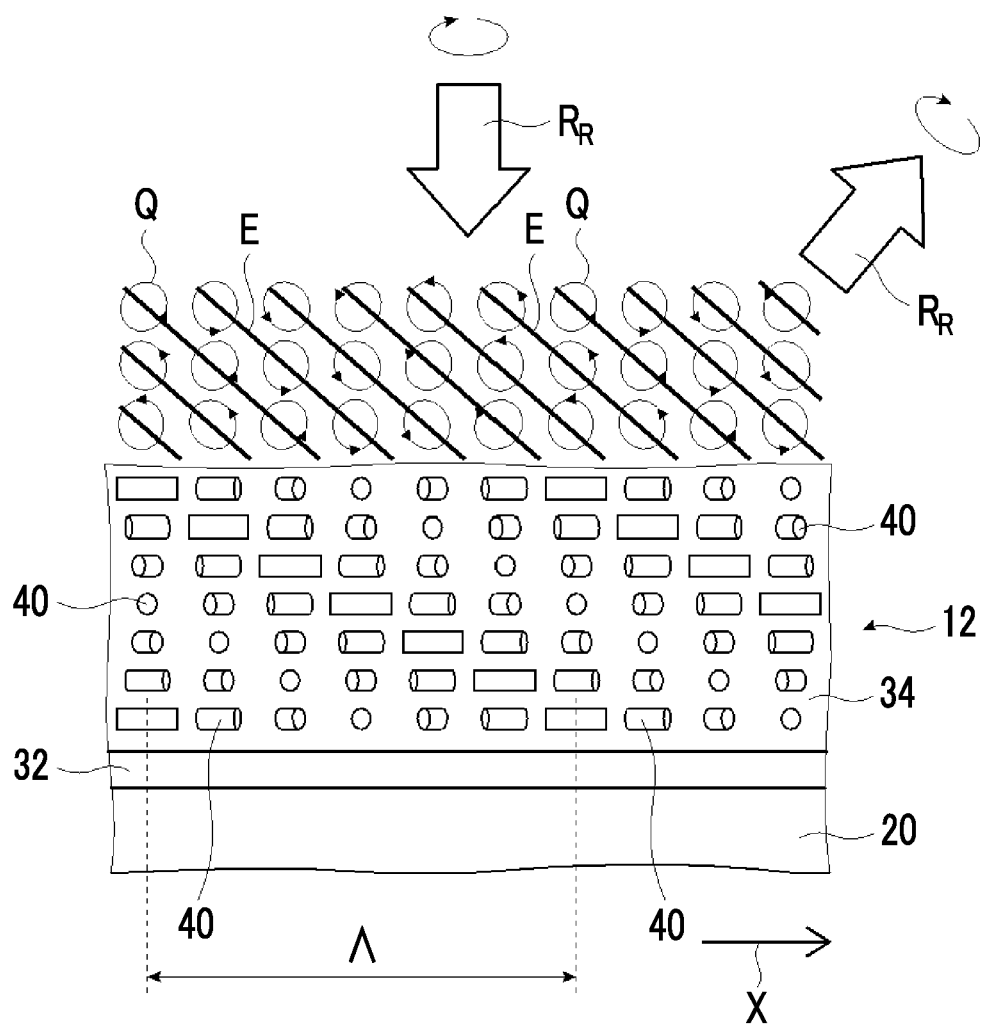
FIG. 6 is a conceptual diagram showing an action of the cholesteric liquid crystal layer in the optical laminate shown in FIG. 3.

As described above, the first cholesteric liquid crystal layer 34 and the second cholesteric liquid crystal layer 36 have the liquid crystal alignment patterns having the same plane direction. Accordingly, as shown in FIG. 6, both the first cholesteric liquid crystal layer 34 and the second cholesteric liquid crystal layer 36 reflect the right circularly polarized light of red light in the one in-plane direction in which the optical axis 40A of the liquid crystal compound 40 rotates, that is, in the arrow X direction.

In the image display device 10 in the example shown in the drawing, for example, the display element 12 emits an image of the right circularly polarized light $R_R$ of red light.

In the image display device 10 including the optical laminates 14a and 14b at both the end portions of the light guide plate 16, the right circularly polarized light $R_R$ of red light emitted from the display element 12 transmits through the light guide plate 16, is incident into the optical laminate 14a, is reflected from the optical laminate 14a in a state where it is tilted in the arrow X direction, and is incident into the light guide plate 16 again at an angle with respect to the normal direction of the main surface of the light guide plate 16. The right circularly polarized light $R_R$ of red light incident into the light guide plate 16 at an angle with respect to the normal direction of the main surface of the light guide plate 16 is repeatedly reflected in the light guide plate 16, is guided to the optical laminate 14b side, is incident into the optical laminate 14b, and is reflected in a direction opposite to the arrow X direction. As a result, the light is emitted from the light guide plate 16 and is emitted to an observation position of the user U such that an image is displayed.

As indicated by a chain line in FIG. 1, a part of external light of a scenery straightly passes through the optical laminate 14b and the light guide plate 16, and is observed by the user U.

Here, in the optical laminate 14 according to the embodiment of the present invention, in the first cholesteric liquid crystal layer 34 and the second cholesteric liquid crystal layer 36, the pitches P are different from each other the pitch P being the length of one helical pitch in the thickness direction over which the liquid crystal compound 40 rotates by 360° in the helical structure of the cholesteric liquid crystalline phase.

In the example shown in the drawing, the pitch P of the first cholesteric liquid crystal layer 34 is longer than that of the second cholesteric liquid crystal layer 36 on the light incidence side. The present invention is not limited to this example, the pitch P of the second cholesteric liquid crystal layer 36 on the light incidence side may be longer than that of the first cholesteric liquid crystal layer 34.

According to the present invention, with the above-described configuration, the image emitted from the display element 12 can be suitably reflected irrespective of the position of the display 20 in the plane direction such that the image emitted from the display element 12 can be displayed at a wide field of view with high efficiency.

As described above, the image display device 10 (display 20) in the example shown in the drawing displays a red monochrome image. Accordingly, the first cholesteric liquid crystal layer 34 and the second cholesteric liquid crystal layer 36 sets the helical pitch P such that red light can be reflected.

Here, the entirety of an image displayed by the display 20 is not incident into the first cholesteric liquid crystal layer 34 and the second cholesteric liquid crystal layer 36 from the normal direction. The normal line is a line in a direction perpendicular to the main surface (maximum surface).

That is, as conceptually shown in FIG. 2, for example, an image (solid line) displayed at the center of the display 20 is incident into the first cholesteric liquid crystal layer 34 and the second cholesteric liquid crystal layer 36 from the normal direction. On the other hand, an image (broken line) displayed at an end portion of the display 20 is incident obliquely to the normal line of the first cholesteric liquid crystal layer 34 and the second cholesteric liquid crystal layer 36.

As is well-known, in a case where light is obliquely incident into the cholesteric liquid crystal layer, so-called blue shift (short-wavelength shift) in which the wavelength in a wavelength range where light is selectively reflected decreases occurs.

That is, for example, in a case where the display 20 displays a red light image and the selective reflection wavelength range of the cholesteric liquid crystal layer is set according to the wavelength, the red light incident from the normal direction is appropriately reflected. Regarding the red light of the display end portion that is incident in a state where it is tilted with respect to the normal line, the reflectivity (reflection efficiency) decreases significantly due to the blue shift.

As a result, in AR glasses in which an image is incident in a state where it is tilted with respect to a light guide plate using a cholesteric liquid crystal layer of the related art, an image of a peripheral portion of a display cannot be appropriately displayed, and thus the field of view (FOV) is narrowed.

On the other hand, each of the optical laminates 14a and 14b according to the embodiment of the present invention includes the two cholesteric liquid crystal layers of the first cholesteric liquid crystal layer 34 and the second cholesteric liquid crystal layer 36, in which the helical pitches P in the two cholesteric liquid crystal layers are different from each other. In the example shown in the drawing, for example, the pitch P of the first cholesteric liquid crystal layer 34 is longer than the pitch P of the second cholesteric liquid crystal layer 36.

Therefore, for example, in a case where the second cholesteric liquid crystal layer 36 is the cholesteric liquid crystal layer having the pitch P that selectively reflects typical red light, the red light incident from the normal direction is reflected from the second cholesteric liquid crystal layer 36.

On the other hand, the red light of the end portion of the display 20 that is incident obliquely to the normal line transmits through the second cholesteric liquid crystal layer 36 due to the blue shift. On the other hand, in the first cholesteric liquid crystal layer 34 corresponding to a longer wavelength range than that of the red light having the long pitch P, the red light of the end portion of the display 20 that is incident obliquely to the normal line can be suitably reflected due to the blue shift.

Accordingly, in the optical laminate according to the embodiment of the present invention, the image from the entire surface of the display 20 can be reflected at a high reflectivity irrespective of the position of the display 20. Therefore, for example, by using the optical laminate for AR glasses or the like, a wide field of view can be obtained.

In the optical laminates 14a and 14b according to the embodiment of the present invention, in a case where light components having the same center wavelength are incident at different angles in a range from a normal direction to a direction having an angle of 40° with respect to a normal line, it is preferable that the first cholesteric liquid crystal layer 34 and the second cholesteric liquid crystal layer 36 have an overlapping angle region where a reflectivity is 20% or higher.

Specifically, in a case where light components having the same center wavelength are incident into the first cholesteric liquid crystal layer 34 and the second cholesteric liquid crystal layer 36 at different incidence angles with respect to the cholesteric liquid crystal layer in a range from the normal direction (angle) 0° to the direction having an angle of 40° with respect to the normal line, a relationship between the angle and the reflectivity is plotted for each of the cholesteric liquid crystal layers. In this case, as conceptually shown in FIG. 7, it is preferable that the first cholesteric liquid crystal layer 34 and the second cholesteric liquid crystal layer 36 have an overlapping angle region r where a reflectivity is 20% or higher.

With the above-described configuration, light incident from various directions can be appropriately reflected irrespective of the incidence angle of light into the optical laminates 14a and 14b. In a case where the present invention is applied to, for example, AR glasses, the image from the entire surface of the display 20 can be suitably reflected such that a more suitable wide field of view can be obtained.

Each of the optical laminates 14a and 14b according to the embodiment of the present invention includes the two cholesteric liquid crystal layers of the first cholesteric liquid crystal layer 34 and the second cholesteric liquid crystal layer 36, in which the helical pitches P in the two cholesteric liquid crystal layers are different from each other.

A difference between the pitches P of the two cholesteric liquid crystal layers is not particularly limited, and the length of the longer pitch P is preferably 1.05 to 1.45 times, more preferably 1.1 to 1.35 times, and still more preferably 1.15 to 1.3 times with respect to the length of the shorter pitch P.

Figure 7:
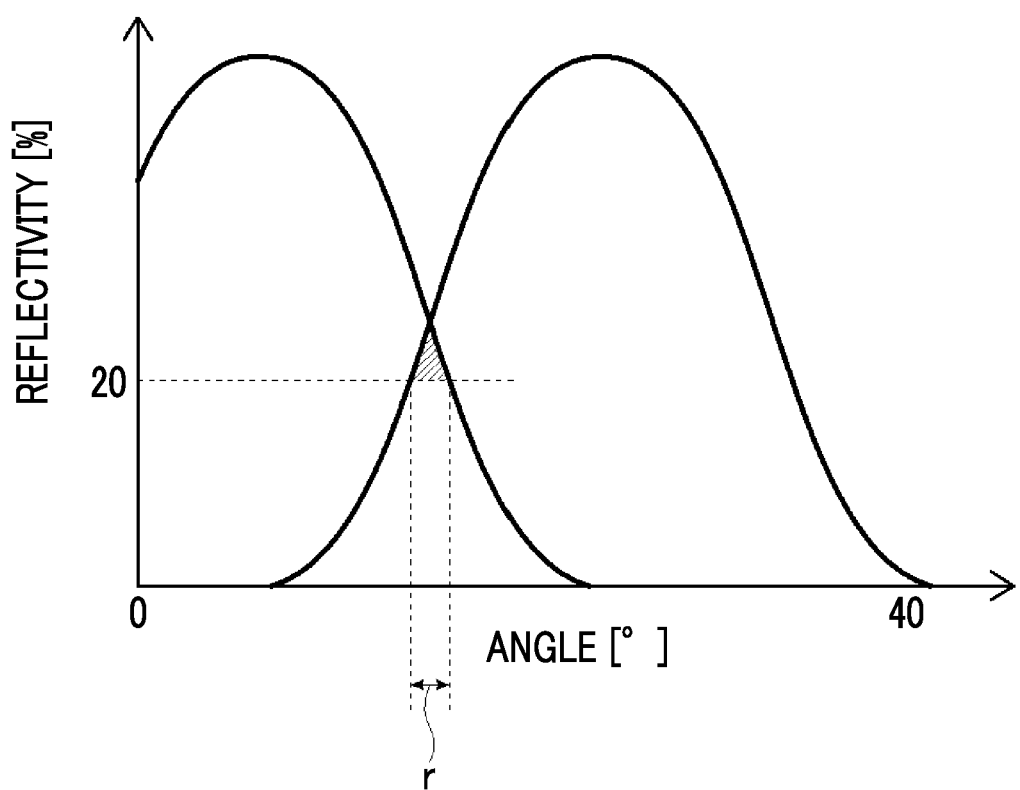
FIG. 7 is a conceptual diagram showing the optical laminate according to the present invention.

By adjusting the difference between the pitches P of the two cholesteric liquid crystal layers to be in the above-described range, the first cholesteric liquid crystal layer 34 and the second cholesteric liquid crystal layer 36 having the angle region r shown in FIG. 7 can be suitably obtained.

As described above, the first cholesteric liquid crystal layer 34 and the second cholesteric liquid crystal layer 36 have the liquid crystal alignment patterns having the same plane direction.

Accordingly, in the first cholesteric liquid crystal layer 34 and the second cholesteric liquid crystal layer 36, the one in-plane directions in which the optical axis 40a of the liquid crystal compound 40 rotates, that is, the arrow X directions match each other. In addition, the direction in which the optical axis 40A of the liquid crystal compound 40 rotates is only the arrow X direction.

In the optical laminate 14 according to the embodiment of the present invention, the first cholesteric liquid crystal layer 34 and the second cholesteric liquid crystal layer 36 have the liquid crystal alignment pattern in which the optical axis 40A of the liquid crystal compound 40 rotates in the arrow X direction.

In the present invention, the length of the single period A as the length over which the optical axis 40A rotates by 180° in the liquid crystal alignment pattern is not particularly limited. Here, as the length of the single period A decreases, the above-described angle of reflected light with respect to incidence light increases. That is, as the single period A decreases, reflected light can be reflected in a state where it is largely tilted, and the light can be made to be incident into the light guide plate 16 at a small angle.

It is preferable that the first cholesteric liquid crystal layer 34 and the second cholesteric liquid crystal layer 36 have a region where the single period A is 10 μm or less, it is more preferable that the first cholesteric liquid crystal layer 34 and the second cholesteric liquid crystal layer 36 have a region where the single period A is 5 μm or less, and it is still more preferable that the first cholesteric liquid crystal layer 34 and the second cholesteric liquid crystal layer 36 have a region where the single period A is 1 μm or less.

The lengths of the single periods A in the liquid crystal alignment patterns of the first cholesteric liquid crystal layer 34 and the second cholesteric liquid crystal layer 36 may be uniform in the entire region in the arrow X direction, or may be different in regions in the arrow X direction.

The first cholesteric liquid crystal layer 34 and the second cholesteric liquid crystal layer 36 have the liquid crystal alignment patterns having the same plane direction. Accordingly, in the first cholesteric liquid crystal layer 34 and the second cholesteric liquid crystal layer 36, the single periods A in the liquid crystal alignment patterns are the same.

The present invention is not limited to the example, and in the first cholesteric liquid crystal layer 34 and the second cholesteric liquid crystal layer 36, the single periods A in the liquid crystal alignment patterns may be different from each other. However, in a case where the single periods A in the first cholesteric liquid crystal layer 34 and the second cholesteric liquid crystal layer 36 are different from each other, the reflection angles of incident circularly polarized light are different from each other. Therefore, the reflection angles of the first cholesteric liquid crystal layer 34 and the second cholesteric liquid crystal layer 36 in the light guide plate 16 are different from each other, and scattering may occur in the display image.

Accordingly, as in the example shown in the drawing, it is preferable that, in the first cholesteric liquid crystal layer 34 and the second cholesteric liquid crystal layer 36, the single periods A in the liquid crystal alignment patterns are the same.

In a case where the single periods A in the liquid crystal alignment patterns of the first cholesteric liquid crystal layer 34 and the second cholesteric liquid crystal layer 36 are different from each other, an alignment film corresponding to the single period A in the liquid crystal alignment pattern of the second cholesteric liquid crystal layer 36 may be formed on the surface of the first cholesteric liquid crystal layer 34.

Each of the optical laminates 14a and 14b includes only the first cholesteric liquid crystal layer 34 and the second cholesteric liquid crystal layer 36 as the cholesteric liquid crystal layers, but the present invention is not limited thereto.

That is, the optical laminate according to the embodiment of the present invention may further include a third cholesteric liquid crystal layer that is the same cholesteric liquid crystal layer and has a helical pitch P different from those of the first cholesteric liquid crystal layer 34 and the second cholesteric liquid crystal layer 36, or may further include one or more cholesteric liquid crystal layers that are the same as each other and have helical pitches P different from each other.

That is, the number of cholesteric liquid crystal layers is not limited as long as the optical laminate according to the embodiment of the present invention includes the first cholesteric liquid crystal layer 34 and the second cholesteric liquid crystal layer 36.

In a preferable aspect of the cholesteric liquid crystal layer shown in FIGS. 3 to 6, the optical axis 40A of the liquid crystal compound 40 in the liquid crystal alignment pattern of the cholesteric liquid crystal layer continuously rotates only in the arrow X direction.

However, the present invention is not limited thereto, and as long as the optical axis 40A of the liquid crystal compound 40 in the optically-anisotropic layer continuously rotates in the one in-plane direction, the optical laminate has a plurality of in-plane directions in which the direction of the optical axis of the liquid crystal compound 40 changes while continuously rotating.

As described above, the first cholesteric liquid crystal layer 34 and the second cholesteric liquid crystal layer 36 have the liquid crystal alignment patterns having the same plane direction. Accordingly, the first cholesteric liquid crystal layer 34 and the second cholesteric liquid crystal layer 36 reflect circularly polarized light having the same turning direction, in which rotation directions of the optical axis 40A of the liquid crystal compound 40 toward the arrow X direction are the same.

On the other hand, in a second aspect of the optical laminate according to the embodiment of the present invention, the first cholesteric liquid crystal layer and the second cholesteric liquid crystal layer reflect circularly polarized light having opposite turning directions, in which rotation directions of the optical axis 40A of the liquid crystal compound 40 toward the arrow X direction are opposite to each other. With this configuration, the same effect as that of the first cholesteric liquid crystal layer 34 and the second cholesteric liquid crystal layer 36 can be obtained.

Each of the optical laminates 14a and 14b corresponds to the display of a monochrome image (in the example shown in the drawing, a red image) and includes one combination of the first cholesteric liquid crystal layer 34 and the second cholesteric liquid crystal layer 36, but the present invention is not limited thereto.

That is, the optical laminate according to the embodiment of the present invention may include two or more combinations of the first cholesteric liquid crystal layers 34 and the second cholesteric liquid crystal layers 36.

Figure 8:
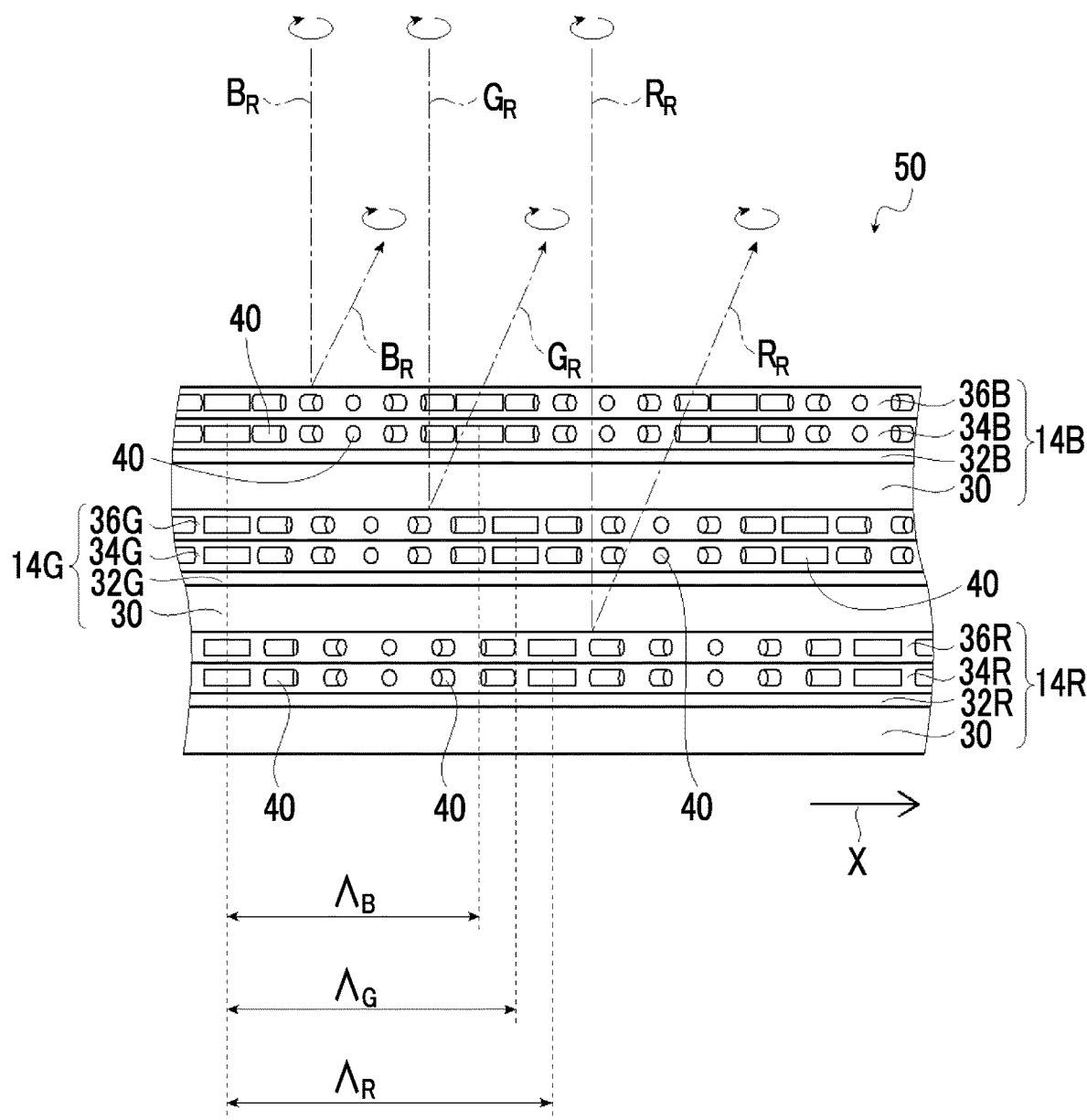
FIG. 8 is a diagram conceptually showing another example of the optical laminate according to the present invention.

FIG. 8 shows an example of this optical laminate.

An optical laminate 50 conceptually shown in FIG. 8 includes three optical laminates including an R reflecting laminate 14R, a G reflecting laminate 14G, and a B reflecting laminate 14B.

The R reflecting laminate 14R corresponds to the reflection of right circularly polarized light $R_R$ of red light and includes the support 30, an alignment film 32R, a first cholesteric liquid crystal layer 34R, and a second cholesteric liquid crystal layer 36R.

The G reflecting laminate 14G corresponds to the reflection of right circularly polarized light $G_R$ of green light and includes the support 30, an alignment film 32G, a first cholesteric liquid crystal layer 34G, and a second cholesteric liquid crystal layer 36G.

The B reflecting laminate 14B corresponds to the reflection of right circularly polarized light $B_R$ of blue light and includes the support 30, an alignment film 32B, a first cholesteric liquid crystal layer 34B, and a second cholesteric liquid crystal layer 36B.

The support, the alignment film, the first cholesteric liquid crystal layer, and the second cholesteric liquid crystal layer in the R reflecting laminate 14R, the G reflecting laminate 14G, and the B reflecting laminate 14B are the same as the support 30, the alignment film 32, the first cholesteric liquid crystal layer 34, and the second cholesteric liquid crystal layer 36 in the optical laminates 14a and 14b. In this case, each of the cholesteric liquid crystal layers has the helical pitch P corresponding to the wavelength range where light is selectively reflected.

Here, in the R reflecting laminate 14R, the G reflecting laminate 14G, and the B reflecting laminate 14B, a permutation of lengths of the wavelength ranges where the cholesteric liquid crystal layers selectively reflect light and a permutation of lengths of the single periods Λ in the liquid crystal alignment patterns of the cholesteric liquid crystal layers are the same as each other.

That is, in the optical laminate 50, the cholesteric liquid crystal layer of the R reflecting laminate 14R corresponding to the reflection of red light reflects light having the longest wavelength range, the cholesteric liquid crystal layer of the G reflecting laminate 14G corresponding to the reflection of green light reflects light having the second longest wavelength range, and the cholesteric liquid crystal layer of the B reflecting laminate 14B corresponding to the reflection of blue light reflects light having the shortest wavelength range.

On the other hand, in the R reflecting laminate 14R, the G reflecting laminate 14G, and the B reflecting laminate 14B, the single period AR of the cholesteric liquid crystal layer of the R reflecting laminate 14R is the longest, the single period AG of the cholesteric liquid crystal layer of the G reflecting laminate 14G is the second longest, and the single period AB of the cholesteric liquid crystal layer of the B reflecting laminate 14B is the shortest.

A reflection angle of light from the cholesteric liquid crystal layer in which the optical axis 40A of the liquid crystal compound 40 continuously rotates in the one in-plane direction (arrow X direction) varies depending on wavelengths of light to be reflected. Specifically, as the wavelength of light increases, the angle of reflected light with respect to incidence light increases. Accordingly, red light reflected from the R reflecting laminate 14R has the largest angle of reflected light with respect to incidence light, green light reflected from the G reflecting laminate 14G has the second largest angle of reflected light with respect to incidence light, and blue light reflected from the B reflecting laminate 14B has the smallest angle of reflected light with respect to incidence light.

On the other hand, as described above, in the cholesteric liquid crystal layer having the liquid crystal alignment pattern in which the optical axis 40A of the liquid crystal compound 40 rotates in the one in-plane direction, as the single period Λ over which the optical axis 40A in the liquid crystal alignment pattern rotates by 180° decreases, the angle of reflected light with respect to incidence light increases.

Accordingly, as shown in FIG. 8, in the R reflecting laminate 14R, the G reflecting laminate 14G, and the B reflecting laminate 14B, a permutation of lengths of the wavelength ranges where the cholesteric liquid crystal layers selectively reflect light and a permutation of lengths of the single periods Λ in the liquid crystal alignment patterns of the cholesteric liquid crystal layers are the same as each other. Thus, the wavelength dependence on the reflection angle of light reflected from the optical laminate 50 is significantly reduced, and light components having different wavelengths can be reflected substantially in the same direction.

As a result, even in a case where a full color image is displayed by red light, green light, and blue light, the light can be guided to the light guide plate without the occurrence of color shift, and an appropriate full color image can be displayed without the occurrence of color shift.

In a case where optical laminates having different wavelength ranges where light is selectively reflected are laminated, the laminating order is not limited.

In a case where optical laminates having different wavelength ranges where light is selectively reflected are laminated, it is preferable that the optical laminates are laminated such that the wavelength in the wavelength range where light is selectively reflected sequentially increases. As a result, by setting the side where the selective reflection center wavelength is the shortest as the light incidence side, the effect of blue shift can be reduced.

That is, in a case where the optical laminate according to the embodiment of the present invention includes a plurality of combinations of the first cholesteric liquid crystal layers 34 and the second cholesteric liquid crystal layers 36, the present invention is not limited to the configuration including the R reflecting laminate 14R, the G reflecting laminate 14G, and the B reflecting laminate 14B shown in FIG. 8.

For example, the optical laminate may appropriately include two layers selected from the R reflecting laminate 14R, the G reflecting laminate 14G, and the B reflecting laminate 14B. Further, the optical laminate may further include a reflecting laminate that selectively reflects ultraviolet light and/or a reflecting laminate that selectively reflects infrared light instead of one or more layers among the R reflecting laminate 14R, the G reflecting laminate 14G, and the B reflecting laminate 14B or in addition to the R reflecting laminate 14R, the G reflecting laminate 14G, and the B reflecting laminate 14B.

Hereinabove, the optical laminate, the light guide element, and the image display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention.

Accordingly, the scope of the present invention is not limited to the following specific examples.

Example 1

[Preparation of Support]
(Preparation of Core Layer Cellulose Acylate Dope)

The following composition was put into a mixing tank and was stirred with each other to dissolve the respective components. As a result, a cellulose acetate solution was prepared as a core layer cellulose acylate dope.

Core Layer Cellulose Acylate Dope

| Cellulose acetate having an acetyl substitution degree of 2.88 | 100 parts by mass |
| Polyester A | 12 parts by mass |
| Ultraviolet absorber V | 2.3 parts by mass |
| Methylene chloride (first solvent) | 430 parts by mass |
| Methanol (second solvent) | 64 parts by mass |

Ultraviolet Absorber V

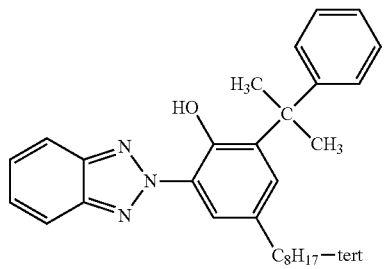

As the polyester A, a polyester A shown in [Table 1] of JP2015-227956A was used.

(Preparation of Outer Layer Cellulose Acylate Dope)

10 parts by mass of the following matting agent solution was added to 90 parts by mass of the above-described core layer cellulose acylate dope to prepare a cellulose acetate solution as an outer layer cellulose acylate dope.

Matting Agent Solution

| Silica particles having an average particle size of 20 nm (AEROSIL R971, manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope | 1 part by mass |

The above-described core layer cellulose acylate dope and the above-described outer layer cellulose acylate dope were filtered through filter paper having an average pore size of 34 μm and a sintered metallic filter having an average pore size of 10 μm, respectively. Next, three layers of the core layer cellulose acylate dope and the outer layer cellulose acylate dope disposed on opposite sides of the core layer cellulose acylate dope were simultaneously cast on a drum at 20° C. from casting nozzles using a band casting machine.

Next, the obtained film was removed in a state where the solvent content was about 20 mass %, both ends of the film in the width direction were fixed using a tenter clip, and the film was horizontally stretched to a stretching ratio of 1.1% and dried.

Next, by transporting the film between rolls of a heat treatment device and further drying the film, a cellulose support having a thickness of 20 μm was prepared. In the prepared cellulose support, the thickness of the core layer was 15 μm, and the thickness of each of the outer layers disposed on opposite sides of the core layer was 2.5 μm.

(Saponification Treatment of Support)

The support prepared as described above was caused to pass through a dielectric heating roll at a temperature of 60° C. such that the support surface temperature was increased to 40° C.

Next, an alkali solution shown below was applied to a single surface of the support using a bar coater in an application amount of 14 mL (liter)/m$^2$, the support was heated to 110° C., and the support was transported for 10 seconds under a steam far infrared heater (manufactured by Noritake Co., Ltd.).

Next, 3 mL/m$^2$ of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| Potassium hydroxide | 4.70 parts by mass |
| Water | 15.80 parts by mass |
| Isopropanol | 63.70 parts by mass |
| Surfactant | |
| SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

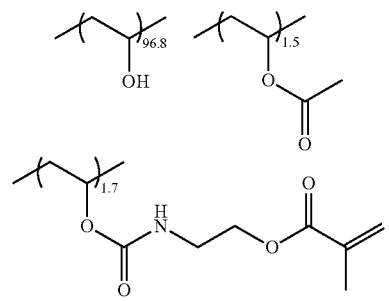

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed. Alignment Film-Forming Coating Solution

| The following material for photo-alignment | 1.00 part by mass |
|---|---|
| Water | 16.00 parts by mass |
| Butoxyethanol | 42.00 parts by mass |
| Propylene glycol monomethyl ether | 42.00 parts by mass |

—Material for Photo-Alignment—

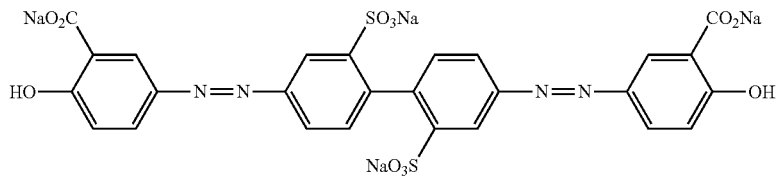

(Exposure of Alignment Film)

The alignment film 32 was exposed using the exposure device shown in FIG. 9 to form an alignment film P-1 having an alignment pattern.

In the exposure device, a laser that emits laser light having a wavelength (325 nm) was used as the laser. The exposure dose of the interference light was 300 mJ/cm$^2$. The single period (the length over which the optical axis rotates by 180°) of an alignment pattern formed by interference of two laser beams was controlled by changing an intersecting angle (intersecting angle α) between the two beams.

(Formation of First Cholesteric Liquid Crystal Layer)

As the liquid crystal composition forming the first cholesteric liquid crystal layer, the following composition A-1 was prepared. This composition A-1 is a liquid crystal composition forming a cholesteric liquid crystal layer (cholesteric liquid crystalline phase) in which the length of one helical pitch (pitch P) in the cholesteric liquid crystalline phase is 433 nm and right circularly polarized light is reflected.

| Composition A-1 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |

-continued

| Composition A-1 | |
|---|---|
| Photosensitizer (KAYACURE DETX-S, manufactured by Nippon Kayaku Co., Ltd.) | 1.00 part by mass |
| Chiral agent Ch-1 | 4.57 parts by mass |
| Leveling agent T-1 | 0.08 parts by mass |
| Methyl ethyl ketone | 2840.00 parts by mass |

Rod-Shaped Liquid Crystal Compound L-1

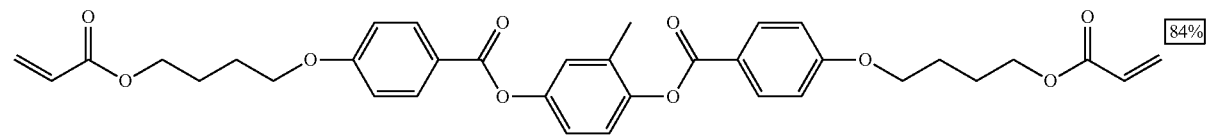

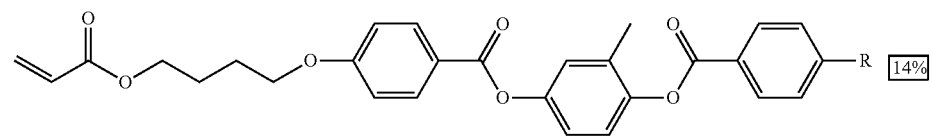

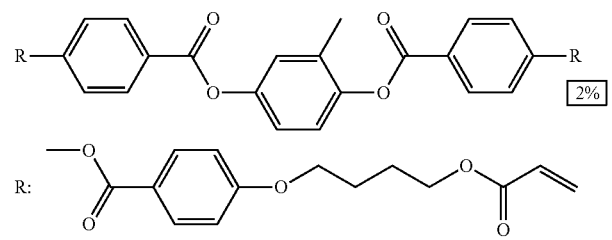

Chiral Agent Ch-1

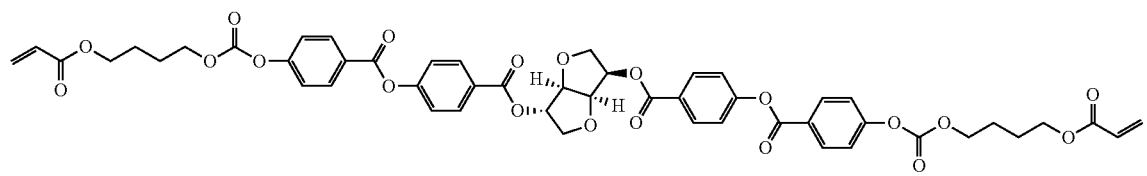 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Leveling Agent T-1

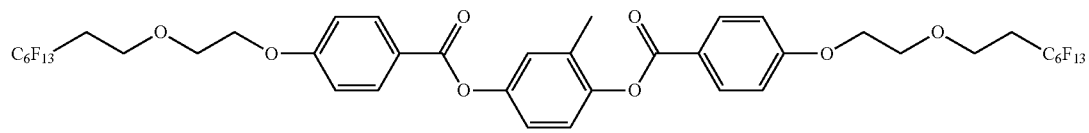

The first cholesteric liquid crystal layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film 32 was reflected from a lower surface of the liquid crystal layer to an upper surface thereof.

Regarding the first liquid crystal layer, the following composition A-1 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, and a first cholesteric liquid crystal layer was formed. In a case where a cross-section of a coating layer was observed with a scanning electron microscope (SEM), the cholesteric liquid crystalline phase had 8 pitches.

It was verified using a polarizing microscope that the first cholesteric liquid crystal layer had a periodically aligned surface as shown in FIG. 5. In a case where a cross-section of the coating layer was observed with a SEM, in the liquid crystal alignment pattern of the first cholesteric liquid crystal layer, the single period over which the optical axis of the liquid crystal compound rotated by 180° was 0.44 μm.

(Formation of Second Cholesteric Liquid Crystal Layer)

A composition A-2 was prepared using the same method as that of the composition A-1 forming the first cholesteric liquid crystal layer, except that the amount of the chiral agent was changed to 3.67 parts by mass. This composition A-2 is a liquid crystal composition forming a cholesteric liquid crystal layer (cholesteric liquid crystalline phase) in which the length of one helical pitch (pitch P) in the cholesteric liquid crystalline phase is 534 nm and right circularly polarized light is reflected.

The second cholesteric liquid crystal layer was formed on the surface of the first cholesteric liquid crystal layer using the same method as that of the first cholesteric liquid crystal layer, except that the composition A-2 was used. In a case where a cross-section of the coating layer was observed with a SEM, the cholesteric liquid crystalline phase had 8 pitches.

It was verified using a polarizing microscope that the second cholesteric liquid crystal layer had a periodically aligned surface as shown in FIG. 5. In the liquid crystal alignment pattern of the second cholesteric liquid crystal layer, the single period over which the optical axis of the liquid crystal compound rotated by 180° was 0.44 μm.

As a result, an optical laminate including the support, the alignment film, the first cholesteric liquid crystal layer, and the second cholesteric liquid crystal layer was prepared.

Comparative Example 1

An optical laminate was prepared using the same method as that of Example 1, except that the second cholesteric liquid crystal layer was not formed.

Example 2

(Formation of Alignment Film)

An alignment film P-1 was prepared using the same method as that of Example 1, except that, in a case where the alignment film was exposed using the exposure device shown in FIG. 9, the intersecting angle between two light components was changed.

(Formation of First Cholesteric Liquid Crystal Layer)

A composition A-3 was prepared using the same method as that of the composition A-1 forming the first cholesteric liquid crystal layer according to Example 1, except that the amount of the chiral agent was changed to 5.74 parts by mass. This composition A-3 is a liquid crystal composition forming a cholesteric liquid crystal layer (cholesteric liquid crystalline phase) in which the length of one helical pitch (pitch P) in the cholesteric liquid crystalline phase is 350 nm and right circularly polarized light is reflected.

A first cholesteric liquid crystal layer was formed on the surface of the alignment film P-1 using the same method as that of Example 1, except that the composition A-3 was used. In a case where a cross-section of the coating layer was observed with a SEM, the cholesteric liquid crystalline phase had 8 pitches.

It was verified using a polarizing microscope that the first cholesteric liquid crystal layer had a periodically aligned surface as shown in FIG. 5. In a case where a cross-section of the coating layer was observed with a SEM, in the liquid crystal alignment pattern of the first cholesteric liquid crystal layer, the single period over which the optical axis of the liquid crystal compound rotated by 180° was 0.36 μm.

(Formation of Second Cholesteric Liquid Crystal Layer)

A composition A-4 was prepared using the same method as that of the composition A-3 forming the first cholesteric liquid crystal layer, except that the amount of the chiral agent was changed to 4.76 parts by mass. This composition A-4 is a liquid crystal composition forming a cholesteric liquid crystal layer (cholesteric liquid crystalline phase) in which the length of one helical pitch (pitch P) in the cholesteric liquid crystalline phase is 417 nm and right circularly polarized light is reflected.

The second cholesteric liquid crystal layer was formed on the surface of the first cholesteric liquid crystal layer using the same method as that of the first cholesteric liquid crystal layer, except that the composition A-4 was used. In a case where a cross-section of the coating layer was observed with a SEM, the cholesteric liquid crystalline phase had 8 pitches.

It was verified using a polarizing microscope that the second cholesteric liquid crystal layer had a periodically aligned surface as shown in FIG. 5. In the liquid crystal alignment pattern of the second cholesteric liquid crystal layer, the single period over which the optical axis of the liquid crystal compound rotated by 180° was 0.36 μm.

As a result, an optical laminate including the support, the alignment film, the first cholesteric liquid crystal layer, and the second cholesteric liquid crystal layer was prepared.

Comparative Example 2

An optical laminate was prepared using the same method as that of Example 2, except that the second cholesteric liquid crystal layer was not formed.

Example 3

(Formation of Alignment Film)

An alignment film P-1 was prepared using the same method as that of Example 1, except that, in a case where the alignment film was exposed using the exposure device shown in FIG. 9, the intersecting angle between two light components was changed.

(Formation of First Cholesteric Liquid Crystal Layer)

A composition A-5 was prepared using the same method as that of the composition A-1 forming the first cholesteric liquid crystal layer according to Example 1, except that the amount of the chiral agent was changed to 3.80 parts by mass. This composition A-5 is a liquid crystal composition forming a cholesteric liquid crystal layer (cholesteric liquid crystalline phase) in which the length of one helical pitch (pitch P) in the cholesteric liquid crystalline phase is 517 nm and right circularly polarized light is reflected.

A first cholesteric liquid crystal layer was formed on the surface of the alignment film P-1 using the same method as that of Example 1, except that the composition A-5 was used. In a case where a cross-section of the coating layer was observed with a SEM, the cholesteric liquid crystalline phase had 8 pitches.

It was verified using a polarizing microscope that the first cholesteric liquid crystal layer had a periodically aligned surface as shown in FIG. 5. In a case where a cross-section of the coating layer was observed with a SEM, in the liquid crystal alignment pattern of the first cholesteric liquid crystal layer, the single period over which the optical axis of the liquid crystal compound rotated by 180° was 0.51 μm.

(Formation of Second Cholesteric Liquid Crystal Layer)

A composition A-6 was prepared using the same method as that of the composition A-5 forming the first cholesteric liquid crystal layer, except that the amount of the chiral agent was changed to 3.07 parts by mass. This composition A-6 is a liquid crystal composition forming a cholesteric liquid crystal layer (cholesteric liquid crystalline phase) in which the length of one helical pitch (pitch P) in the cholesteric liquid crystalline phase is 633 nm and right circularly polarized light is reflected.

The second cholesteric liquid crystal layer was formed on the surface of the first cholesteric liquid crystal layer using the same method as that of the first cholesteric liquid crystal layer, except that the composition A-6 was used. In a case where a cross-section of the coating layer was observed with a SEM, the cholesteric liquid crystalline phase had 8 pitches.

It was verified using a polarizing microscope that the second cholesteric liquid crystal layer had a periodically aligned surface as shown in FIG. 5. In the liquid crystal alignment pattern of the second cholesteric liquid crystal layer, the single period over which the optical axis of the liquid crystal compound rotated by 180° was 0.51 μm.

As a result, an optical laminate including the support, the alignment film, the first cholesteric liquid crystal layer, and the second cholesteric liquid crystal layer was prepared.

Comparative Example 3

An optical laminate was prepared using the same method as that of Example 3, except that the second cholesteric liquid crystal layer was not formed.

[Evaluation]

Regarding each of the optical laminates prepared in Examples 1 to 3 and Comparative Examples 1 to 3, an angle range where the reflectivity was high was measured using the following method.

—Measurement of Reflectivity—

Figure 10:
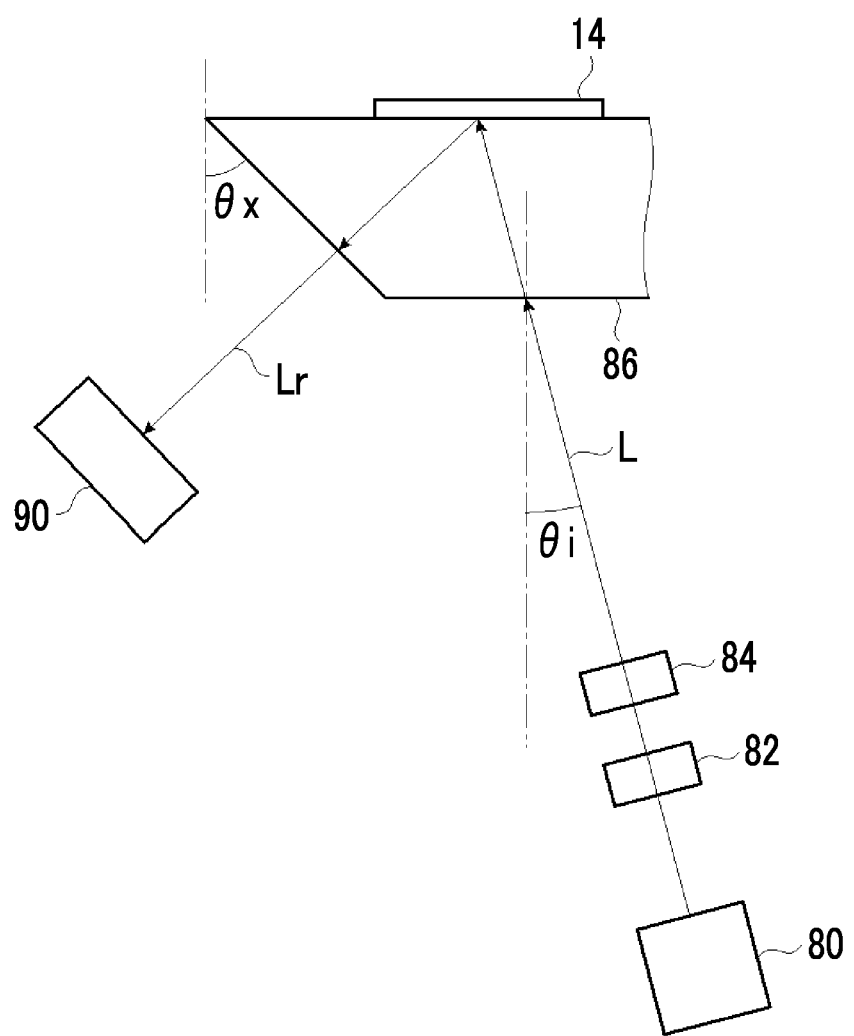
FIG. 10 is a conceptual diagram showing a method of measuring a reflectivity.

A method of measuring a reflectivity will be described with reference to FIG. 10.

Light emitted from a laser 80 was caused to transmit through a linear polarizer 82 and a λ/4 plate 84. As a result, light L of right circularly polarized light $P_R$ was obtained. Through a light guide plate, this light L was caused to be incident into the surface of the optical laminate 14. In this case, the light intensity of diffracted light L, that was reflected and diffracted due to the diffraction effect and the selective reflection effect of the optical laminate 14 was measured using a photodetector 90. A ratio between the light intensity of the diffracted light Lr and the light intensity of the light L was obtained to obtain the relative light intensity value of the diffracted light Lr relative to the incidence light. The optical laminate was bonded to the light guide plate where an end portion was tilted as shown in FIG. 10, and the evaluation was performed. In this case, a surface of the light guide plate into which light was incident and the main surface of the optical laminate were bonded to be parallel to each other.

While changing the incidence angle into the light guide plate in a range of −40° to +40°, the relative light intensity value was evaluated. Optionally, the tilt angle of the light guide plate end portion was changed, and the evaluation was performed.

Using the Fresnel formula, a reflectivity RD of the optical laminate was obtained except for the effect of a reflectivity Ri on the light guide plate surface during incidence and a reflectivity Ro on the light guide plate surface during emission from the light guide plate.

Reflectivity $RD=Lr/L/(1-Ri)/(1-Ro)$

Here, as the light guide plate, glass having a refractive index of 1.52 was used. As the reflectivity obtained using the Fresnel formula, an average value of reflectivities of s waves and p waves was used.

An incidence angle range where a relative reflectivity $R_R(\theta i)$ between a maximum reflectivity RDmax and of reflectivity $RD(\theta i)$ at each incidence angle $\theta i$ was 0.7 or higher (70%) was evaluated.

Relative Reflectivity $R_R(\theta i)=RD(\theta i)/RDmax$

For the evaluation, laser having a wavelength of 550 nm was used in Example 1 and Comparative Example 1, laser having a wavelength of 450 nm was used in Example 2 and Comparative Example 2, and laser having a wavelength of 650 nm was used in Example 3 and Comparative Example 3.

A case where the incidence angle range was enlarged by 6° or more as compared to Comparative Examples was evaluated as A A case where the enlarged incidence angle range was 4° or more and less than 6° was evaluated as B A case where the enlarged incidence angle range was 2° or more and less than 4° was evaluated as C.

A case where the enlarged incidence angle range was less than 2° was evaluated as D The results and the specification of the optical laminates are shown in the following table.

TABLE 1

|  | | Example 1 | Comparative Example 1 | Example 2 | Comparative Example 2 | Example 3 | Comparative Example 3 |
|---|---|---|---|---|---|---|---|
| First Cholesteric Liquid Crystal Layer | Helical Pitch [nm] | 433 | 433 | 350 | 350 | 517 | 517 |
|  | Single Period [μm] | 0.44 | 0.44 | 0.36 | 0.36 | 0.51 | 0.51 |
| Second Cholesteric Liquid Crystal Layer | Helical Pitch [nm] | 534 | — | 417 | — | 633 | — |
|  | Single Period [μm] | 0.44 | — | 0.36 | — | 1.51 | — |
| Helical Pitch Ratio | | 1.23 | — | 1.19 | — | 1.22 | — |
| Angle Range where Reflectivity is High | | A | — | A | — | A | — |

The present invention is suitably applicable to various uses where light is reflected in an optical device, for example, a diffraction element that causes light to be incident into a light guide plate of AR glasses or emits light to the light guide plate.

EXPLANATION OF REFERENCES

10: image display device
12: display element
14*a*, 14*b*: optical laminate
14R: R reflecting laminate
14G: G reflecting laminate
14B: B reflecting laminate
16: light guide plate
20: display
24: projection lens
30: support
32, 32R, 32G, 32B: alignment film
34, 34R, 34G, 34B: first cholesteric liquid crystal layer
36, 36R, 36G, 36B: second cholesteric liquid crystal layer
40: liquid crystal compound
40A: optical axis
60: exposure device
62: laser
64: light source
68: polarization beam splitter
70*a*, 70B: mirror
72A, 72B: λ/4 plate
$B_R$: right circularly polarized light of blue light
$G_R$: right circularly polarized light of green light
$R_R$: right circularly polarized light of red light
M: laser light
MA, MB: beam
MP: P polarized light
MS: S polarized light
$P_O$: linearly polarized light
$P_R$: right circularly polarized light
$P_L$: left circularly polarized light
Q: absolute phase
E: equiphase surface
U: user

What is claimed is:

1. An optical laminate comprising:
   a first cholesteric liquid crystal layer and a second cholesteric liquid crystal layer that each selectively reflect a red light which is light in a wavelength range of 620 to 750 nm, a green light which is light in a wavelength range of 495 to 570 nm, or a blue light which is light in a wavelength range of 420 to 490 nm, have a helical structure in which a liquid crystal compound is helically turned and laminated, have a liquid crystal alignment pattern in which a direction of an optical axis derived from the liquid crystal compound continuously rotates in at least one in-plane direction, and selectively reflect light in a wavelength range of a same color,
   wherein in the first cholesteric liquid crystal layer and the second cholesteric liquid crystal layer,
   helical pitches as lengths in a thickness direction over which the liquid crystal compound that is helically turned and laminated in the cholesteric liquid crystal layer turns by 360° are different from each other,
   turning directions of circularly polarized light to be reflected are the same,
   rotation directions of the direction of the optical axis derived from the liquid crystal compound that continuously rotates in at least one in-plane direction in the liquid crystal alignment pattern are the same, a length of a longer helical pitch of the helical pitches is 1.05 to 1.45 times with respect to a length of a shorter helical pitch of the helical pitches, and in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, lengths of the single periods in the liquid crystal alignment pattern of the first cholesteric liquid crystal layer and the liquid crystal alignment pattern of the second cholesteric liquid crystal layer are the same.

2. The optical laminate according to claim 1,
wherein in the liquid crystal alignment pattern of the first cholesteric liquid crystal layer and the liquid crystal alignment pattern of the second cholesteric liquid crystal layer, the direction of the optical axis derived from the liquid crystal compound changes while continuously rotating only in the one in-plane direction, and in the liquid crystal alignment pattern of the first cholesteric liquid crystal layer and the liquid crystal alignment pattern of the second cholesteric liquid crystal layer, the one in-plane directions are the same.

3. The optical laminate according to claim 1,
wherein in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, the liquid crystal alignment pattern of the first cholesteric liquid crystal layer and the liquid crystal alignment pattern of the second cholesteric liquid crystal layer have a region where the single period is 10 μm or less.

4. The optical laminate according to claim 1,
wherein in a case where light components having the same center wavelength are incident at different angles in a range from a normal direction to a direction having an angle of 40° with respect to a normal line, the first cholesteric liquid crystal layer and the second cholesteric liquid crystal layer have an overlapping angle region where a reflectivity is 20% or higher.

5. A light guide element comprising:
a light guide plate; and
the optical laminate according to claim 1 that is provided on the light guide plate.

6. The light guide element according to claim 5,
wherein a plurality of optical laminates spaced from each other are provided on the light guide plate.

7. An image display device comprising:
the light guide element according to claim 5; and
a display element that emits an image to the optical laminate of the light guide element.

8. The image display device according to claim 7,
wherein the display element emits circularly polarized light to the optical laminate.

9. An optical laminate comprising: a first cholesteric liquid crystal layer and a second cholesteric liquid crystal layer that have a liquid crystal alignment pattern in which a direction of an optical axis derived from a liquid crystal compound changes while continuously rotating in at least one in-plane direction, and have a helical structure in which the liquid crystal compound is helically turned and laminated, wherein in the first cholesteric liquid crystal layer and the second cholesteric liquid crystal layer, helical pitches as lengths in a thickness direction over which the liquid crystal compound that is helically turned and laminated in the cholesteric liquid crystalline phase turns by 360° are different from each other, turning directions of circularly polarized light to be reflected are opposite to each other, and rotation directions of the direction of the optical axis derived from the liquid crystal compound that continuously rotates in at least one in-plane direction in the liquid crystal alignment pattern are opposite to each other, the first cholesteric liquid crystal layer and the second cholesteric liquid crystal layer each reflect light of a same color selected from a red light which is light in a wavelength range of 620 to 750 nm, a green light which is light in a wavelength range of 495 to 570 nm, or a blue light which is light in a wavelength range of 420 to 490 nm, a length of a longer helical pitch is 1.05 to 1.45 times with respect to a length of a shorter helical pitch, and lengths of the single periods in the liquid crystal alignment pattern of the first cholesteric liquid crystal layer and the liquid crystal alignment pattern of the second cholesteric liquid crystal layer are the same.

10. The optical laminate according to claim 9,
wherein in the liquid crystal alignment pattern of the first cholesteric liquid crystal layer and the liquid crystal alignment pattern of the second cholesteric liquid crystal layer, the direction of the optical axis derived from the liquid crystal compound changes while continuously rotating only in the one in-plane direction, and in the liquid crystal alignment pattern of the first cholesteric liquid crystal layer and the liquid crystal alignment pattern of the second cholesteric liquid crystal layer, the one in-plane directions are the same.

11. The optical laminate according to claim 9,
wherein in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, lengths of the single periods in the liquid crystal alignment pattern of the first cholesteric liquid crystal layer and the liquid crystal alignment pattern of the second cholesteric liquid crystal layer are the same.

12. The optical laminate according to claim 9,
wherein in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, the liquid crystal alignment pattern of the first cholesteric liquid crystal layer and the liquid crystal alignment pattern of the second cholesteric liquid crystal layer have a region where the single period is 10 μm or less.

13. The optical laminate according to claim 9,
wherein in a case where light components having the same center wavelength are incident at different angles in a range from a normal direction to a direction having an angle of 40° with respect to a normal line, the first cholesteric liquid crystal layer and the second cholesteric liquid crystal layer have an overlapping angle region where a reflectivity is 20% or higher.

14. The optical laminate according to claim 9, comprising:

a plurality of combinations of the first cholesteric liquid crystal layers and the second cholesteric liquid crystal layers, in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, in the plurality of combinations of the first cholesteric liquid crystal layers and the second cholesteric liquid crystal layers, a permutation of lengths of wavelengths in wavelength ranges where light is selectively reflected is the same as a permutation of lengths of the single periods.

15. The optical laminate according to claim 14, comprising:

two or more combinations among the combinations including a combination of the first cholesteric liquid crystal layer and the second cholesteric liquid crystal layer having a wavelength range where light is selectively reflected in a red light range, a combination of the first cholesteric liquid crystal layer and the second cholesteric liquid crystal layer having a wavelength range where light is selectively reflected in a green light range, and a combination of the first cholesteric liquid crystal layer and the second cholesteric liquid crystal layer having a wavelength range where light is selectively reflected in a blue light range.

16. A light guide element comprising:

a light guide plate; and the optical laminate according to claim 9 that is provided on the light guide plate.

17. An image display device comprising:

the light guide element according to claim 16; and a display element that emits an image to the optical laminate of the light guide element.

18. An optical laminate comprising:

a first cholesteric liquid crystal layer and a second cholesteric liquid crystal layer that each selectively reflect a red light which is light in a wavelength range of 620 to 750 nm, a green light which is light in a wavelength range of 495 to 570 nm, or a blue light which is light in a wavelength range of 420 to 490 nm, have a helical structure in which a liquid crystal compound is helically turned and laminated, have a liquid crystal alignment pattern in which a direction of an optical axis derived from the liquid crystal compound continuously rotates in at least one in-plane direction, and selectively reflect light in a wavelength range of a same color, wherein in the first cholesteric liquid crystal layer and the second cholesteric liquid crystal layer, helical pitches as lengths in a thickness direction over which the liquid crystal compound that is helically turned and laminated in the cholesteric liquid crystal layer turns by 360° are different from each other, turning directions of circularly polarized light to be reflected are the same, rotation directions of the direction of the optical axis derived from the liquid crystal compound that continuously rotates in at least one in-plane direction in the liquid crystal alignment pattern are the same, the optical laminate comprises two or more combinations among the combinations including a red light reflector combination of the first cholesteric liquid crystal layer and the second cholesteric liquid crystal layer that each selectively reflect light in the wavelength range of red light, a green light reflector combination of the first cholesteric liquid crystal layer and the second cholesteric liquid crystal layer that each selectively reflect light in the wavelength range of green light, a blue light reflector combination of the first cholesteric liquid crystal layer and the second cholesteric liquid crystal layer that each selectively reflect light in the wavelength range of blue light, in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, in the red light reflector combination, the green light reflector combination, and the blue light reflector combination, a permutation of lengths of wavelengths in wavelength ranges where light is selectively reflected is the same as a permutation of lengths of the single periods, and lengths of the single periods in the liquid crystal alignment pattern of the first cholesteric liquid crystal layer and the liquid crystal alignment pattern of the second cholesteric liquid crystal layer are the same.

* * * * *